(12) United States Patent
Yan et al.

(10) Patent No.: US 11,160,116 B2
(45) Date of Patent: Oct. 26, 2021

(54) COMMUNICATION METHOD AND COMMUNICATIONS APPARATUS

(71) Applicant: Huawei Technologies Co., Ltd., Shenzhen (CN)

(72) Inventors: Mao Yan, Chengdu (CN); Huang Huang, Shenzhen (CN); Kuandong Gao, Chengdu (CN); Hua Shao, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 16/523,668

(22) Filed: Jul. 26, 2019

(65) Prior Publication Data

US 2019/0350009 A1 Nov. 14, 2019

Related U.S. Application Data

(63) Continuation of application No. PCT/CN2018/119420, filed on Dec. 5, 2018.

(30) Foreign Application Priority Data

Jan. 12, 2018 (CN) .......................... 201810029540.0

(51) Int. Cl.
*H04W 74/08* (2009.01)
*H04L 5/00* (2006.01)
(Continued)

(52) U.S. Cl.
CPC ....... *H04W 74/0833* (2013.01); *H04L 5/0094* (2013.01); *H04W 52/242* (2013.01); *H04W 52/36* (2013.01); *H04W 72/0473* (2013.01)

(58) Field of Classification Search
CPC .......... H04W 74/0833; H04W 52/242; H04W 52/36; H04W 72/0473; H04L 5/0094
(Continued)

(56) References Cited

U.S. PATENT DOCUMENTS

2010/0074130 A1 3/2010 Bertrand et al.
2014/0185481 A1* 7/2014 Seol ...................... H04W 52/24
370/252
(Continued)

FOREIGN PATENT DOCUMENTS

CN 103037491 A 4/2013
CN 103179654 A 6/2013
(Continued)

OTHER PUBLICATIONS

3GPP TS 38.211 V15.0.0 (Dec. 2017), 3rd Generation Partnership Project; Technical Specification Group Radio Access Network; NR; Physical channels and modulation (Year: 2017).*
(Continued)

*Primary Examiner* — Yemane Mesfin
*Assistant Examiner* — Intekhaab A Siddiquee
(74) *Attorney, Agent, or Firm* — Slater Matsil, LLP

(57) ABSTRACT

This application discloses a communication method and a communications apparatus. The method includes: determining, by a terminal device, transmission power for sending a random access preamble, where the transmission power is related to a random access preamble format and an offset based on the random access preamble format; and sending, by the terminal device, the random access preamble at the determined transmission power. The random access preamble format includes some or all of 0 to 3, A0 to A3, B1 to B4, C0, and C2. The corresponding apparatus is further disclosed. In this application, offsets corresponding to a plurality of random access preamble formats in a next-generation mobile communications system are provided, so that the transmission power of the random access preamble can be properly determined.

9 Claims, 5 Drawing Sheets

(51) Int. Cl.
  *H04W 52/24* (2009.01)
  *H04W 52/36* (2009.01)
  *H04W 72/04* (2009.01)
  *H04W 52/16* (2009.01)
  *H04W 52/48* (2009.01)
  *H04W 52/50* (2009.01)
  *H04W 74/00* (2009.01)
  *H04W 52/32* (2009.01)
  *H04W 52/54* (2009.01)

(58) Field of Classification Search
  USPC .......................................................... 370/329
  See application file for complete search history.

(56) References Cited

U.S. PATENT DOCUMENTS

| | | |
|---|---|---|
| 2016/0234787 A1 | 8/2016 | Liu |
| 2018/0317180 A1 | 11/2018 | Li et al. |
| 2019/0159133 A1 | 5/2019 | Liu |
| 2020/0136708 A1* | 4/2020 | Pan .................... H04B 7/0617 |
| 2020/0229236 A1* | 7/2020 | Ohara .................. H04W 74/00 |

FOREIGN PATENT DOCUMENTS

| | | |
|---|---|---|
| CN | 103687009 A | 3/2014 |
| CN | 106961721 A | 7/2017 |
| EP | 3223573 A1 | 9/2016 |
| EP | 3091811 A1 | 11/2016 |
| JP | 2011511515 A | 4/2011 |
| JP | 2013034213 A | 2/2013 |
| JP | 2017507569 A | 3/2017 |
| WO | 2015021605 A1 | 2/2015 |
| WO | 2016121252 A1 | 8/2016 |
| WO | 2017044155 A1 | 3/2017 |
| WO | 2018204887 A1 | 11/2018 |
| WO | WO-2019028881 A * | 2/2019 |

OTHER PUBLICATIONS

U.S. Appl. No. 62/454,568 P (Year: 2017).*
U.S. Appl. No. 62/501,021 P (Year: 2017).*

3rd Generation Partnership Project; Technical Specification Group Radio Access Network; NR; Physical channels and modulation (Release 15), 3GPP TS 38.211 V15.0.0, Dec. 2017, 73 pages.
3rd Generation Partnership Project; Technical Specification Group Radio Access Network; NR; Physical layer procedures for control (Release 15), 3GPP TS 38.213 V15.0.0, Dec. 2017, 56 pages.
3rd Generation Partnership Project; Technical Specification Group Radio Access Network; NR; Medium Access Control (MAC) protocol specification (Release 15), 3GPP TS 38.321 V15.0.0, Dec. 2017, 55 pages.
3rd Generation Partnership Project; Technical Specification Group Radio Access Network; Evolved Universal Terrestrial Radio Access (E-UTRA); User Equipment (UE) radio transmission and reception (Release 15), 3GPP TS 36.101 V15.0.0, Sep. 2017, 1548 pages.
3rd Generation Partnership Project; Technical Specification Group Radio Access Network; Evolved Universal Terrestrial Radio Access (E-UTRA); Physical channels and modulation (Release 14), 3GPP TS 36.211 V14.5.0, Dec. 2017, 197 pages.
3rd Generation Partnership Project; Technical Specification Group Radio Access Network; Evolved Universal Terrestrial Radio Access (E-UTRA); Physical layer procedures (Release 14), 3GPP TS 36.213 V14.5.0, Dec. 2017, 462 pages.
3rd Generation Partnership Project; Technical Specification Group Radio Access Network; Evolved Universal Terrestrial Radio Access (E-UTRA); Medium Access Control (MAC) protocol specification (Release 15), 3GPP TS 36.321 V15.0.0, Dec. 2017, 109 pages.
CATT, "RACH power control and power ramping procedure," Discussion and Decision, R1-17111617 (Revision of R1-1710034), 3GPP TSG HAN WG1 NR Ad Hoc#2, Jun. 27-30, 2017, 6 pages, 5.1.1.4.2, Qingdao, China.
CATT, "RACH power control and power ramping procedure," 3GPP TSG RAN WG1 NR Ad Hoc#2, Jun. 27-30, 2017, R1-17111617, 5 pages,Qingdao, China.
Nokia, et al., NR Physical Random Access Channel, 3GPP TSG-RAN WG1#90, Aug. 21-25, 2017, R1-1713339, 6 pages, Prague, Czech Republic.
Samsung, SS Bandwidth and Sequence Design, 3GPP TSG RAN WG1 Meeting #88b, R1-1705317, Spokane, WA, Apr. 3-7, 2017, 13 pages.

* cited by examiner

COMMUNICATION METHOD AND COMMUNICATIONS APPARATUS

CROSS-REFERENCE TO RELATED APPLICATIONS

This application is a continuation of International Application No. PCT/CN2018/119420, filed on Dec. 5, 2018, which claims priority of Chinese Patent Application No. 201810029540.0, filed on Jan. 12, 2018; the disclosures of the aforementioned applications are hereby incorporated herein by reference in their entireties.

TECHNICAL FIELD

This application relates to the field of communications technologies, and in particular, to a communication method and a communications apparatus.

BACKGROUND

In a next-generation mobile communications system (for example, New Radio (NR)), a new random access preamble format is defined. However, an offset based on the random access preamble format and how to determine transmission power of a random access preamble are not defined. Therefore, there is an urgent need to define the offset based on the random access preamble format in the next-generation mobile communications system and to determine the transmission power of the random access preamble.

SUMMARY

This application provides a communication method and a communications apparatus, to define an offset that is based on a random access preamble format in a next-generation mobile communications system and properly determine transmission power of a random access preamble.

According to one aspect, a communication method is provided, and includes: determining, by a terminal device, transmission power for sending a random access preamble, where the transmission power is related to a random access preamble format and an offset based on the random access preamble format; and sending, by the terminal device, the random access preamble at the determined transmission power. In this aspect, offsets corresponding to a plurality of random access preamble formats in a next-generation mobile communications system are provided, so that the transmission power of the random access preamble can be properly determined.

In a possible implementation, the determining, by the terminal device, transmission power for sending a random access preamble specifically includes: determining that the transmission power is a smaller value in the following two values: maximum transmission power allowed by the terminal device, and a sum of random access preamble target received power and a path loss $PL_c$ that is estimated by the terminal device; or determining that the transmission power is a smaller value in the following two values: maximum transmission power allowed by the terminal device, and a sum of random access preamble target received power, a subcarrier spacing power offset, $PL_c$, and a value of at least one parameter in the following parameters, where the at least one parameter includes: the subcarrier spacing power offset, a random access preamble sequence offset, and a beam-related offset of a network device and/or the terminal device, where the random access preamble target received power is a sum of the following three parameters: random access preamble initial received target power, the offset based on the random access preamble format, and a product of a quantity of power ramping times minus 1 and a power ramping step. In this implementation, several specific manners for determining the transmission power are provided, and a multi-beam scenario in a New Radio communications system is considered.

In another possible implementation, when a random access preamble format 2 is used, an offset based on the random access preamble format 2 is −6 decibels (dB); or when a random access preamble format 3 is used, an offset based on the random access preamble format 3 is 0 dB. In this implementation, the offsets that are based on the random access formats 2 and 3 and that are different from those in LTE are separately provided.

In still another possible implementation, when a random access preamble format A1 is used, an offset based on the random access preamble format A1 is (X−3) dB; or when a random access preamble format A2 is used, an offset based on the random access preamble format A2 is (X−6) dB; or when a random access preamble format A3 is used, an offset based on the random access preamble format A3 is (X−8) dB; or when a random access preamble format B1 is used, an offset based on the random access preamble format B1 is (X−3) dB; or when a random access preamble format B2 is used, an offset based on the random access preamble format B2 is (X−6) dB; or when a random access preamble format B3 is used, an offset based on the random access preamble format B3 is (X−8) dB; or when a random access preamble format B4 is used, an offset based on the random access preamble format B4 is (X−11) dB; or when a random access preamble format C0 is used, an offset based on the random access preamble format C0 is (X+0) dB; or when a random access preamble format C2 is used, an offset based on the random access preamble format C2 is (X−6) dB, where X is an integer or a decimal. In this implementation, the offset is related to the preset value X, and the preset value may be set based on a requirement.

In still another possible implementation, a value of X is related to a carrier frequency or a subcarrier spacing.

In still another possible implementation, values of X include 0, 3, 8, 11, 14, 17, 18, 19, and 20.

In still another possible implementation, the value of X is received from the network device.

In still another possible implementation, when a subcarrier spacing is a first value, and when a random access preamble format A1 is used, an offset based on the random access preamble format A1 is 8 dB; or when a random access preamble format A2 is used, an offset based on the random access preamble format A2 is 5 dB; or when a random access preamble format A3 is used, an offset based on the random access preamble format A3 is 3 dB; or when a random access preamble format B1 is used, an offset based on the random access preamble format B1 is 8 dB; or when a random access preamble format B2 is used, an offset based on the random access preamble format B2 is 5 dB; or when a random access preamble format B3 is used, an offset based on the random access preamble format B3 is 3 dB; or when a random access preamble format B4 is used, an offset based on the random access preamble format B4 is 0 dB; or when a random access preamble format C0 is used, an offset based on the random access preamble format C0 is 11 dB; or when a random access preamble format C2 is used, an offset based on the random access preamble format C2 is 5 dB. In this implementation, the offset is related to the subcarrier spacing, and specific offsets corresponding to a plurality of random access preamble formats are provided. The network device and the terminal device may pre-store this correspondence table. The terminal device determines a corresponding offset based on a format of a sent random access preamble and the correspondence table.

In still another possible implementation, when a subcarrier spacing is a second value, and when a random access preamble format A1 is used, an offset based on the random access preamble format A1 is 11 dB; or when a random access preamble format A2 is used, an offset based on the random access preamble format A2 is 8 dB; or when a random access preamble format A3 is used, an offset based on the random access preamble format A3 is 6 dB; or when a random access preamble format B1 is used, an offset based on the random access preamble format B1 is 11 dB; or when a random access preamble format B2 is used, an offset based on the random access preamble format B2 is 8 dB; or when a random access preamble format B3 is used, an offset based on the random access preamble format B3 is 6 dB; or when a random access preamble format B4 is used, an offset based on the random access preamble format B4 is 3 dB; or when a random access preamble format C0 is used, an offset based on the random access preamble format C0 is 14 dB; or when a random access preamble format C2 is used, an offset based on the random access preamble format C2 is 8 dB. In this implementation, the offset is related to the subcarrier spacing, and specific offsets corresponding to a plurality of random access preamble formats are provided. The network device and the terminal device may pre-store this correspondence table. The terminal device determines a corresponding offset based on a format of a sent random access preamble and the correspondence table.

In still another possible implementation, when a subcarrier spacing is a third value, and when a random access preamble format A1 is used, an offset based on the random access preamble format A1 is 14 dB; or when a random access preamble format A2 is used, an offset based on the random access preamble format A2 is 11 dB; or when a random access preamble format A3 is used, an offset based on the random access preamble format A3 is 9 dB; or when a random access preamble format B1 is used, an offset based on the random access preamble format B1 is 14 dB; or when a random access preamble format B2 is used, an offset based on the random access preamble format B2 is 11 dB; or when a random access preamble format B3 is used, an offset based on the random access preamble format B3 is 9 dB; or when a random access preamble format B4 is used, an offset based on the random access preamble format B4 is 6 dB; or when a random access preamble format C0 is used, an offset based on the random access preamble format C0 is 17 dB; or when a random access preamble format C2 is used, an offset based on the random access preamble format C2 is 11 dB. In this implementation, the offset is related to the subcarrier spacing, and specific offsets corresponding to a plurality of random access preamble formats are provided. The network device and the terminal device may pre-store this correspondence table. The terminal device determines a corresponding offset based on a format of a sent random access preamble and the correspondence table.

In still another possible implementation, when a subcarrier spacing is a fourth value, and when a random access preamble format A1 is used, an offset based on the random access preamble format A1 is 17 dB; or when a random access preamble format A2 is used, an offset based on the random access preamble format A2 is 14 dB; or when a random access preamble format A3 is used, an offset based on the random access preamble format A3 is 12 dB; or when a random access preamble format B1 is used, an offset based on the random access preamble format B1 is 17 dB; or when a random access preamble format B2 is used, an offset based on the random access preamble format B2 is 14 dB; or when a random access preamble format B3 is used, an offset based on the random access preamble format B3 is 12 dB; or when a random access preamble format B4 is used, an offset based on the random access preamble format B4 is 9 dB; or when a random access preamble format C0 is used, an offset based on the random access preamble format C0 is 20 dB; or when a random access preamble format C2 is used, an offset based on the random access preamble format C2 is 14 dB. In this implementation, the offset is related to the subcarrier spacing, and specific offsets corresponding to a plurality of random access preamble formats are provided. The network device and the terminal device may pre-store this correspondence table. The terminal device determines a corresponding offset based on a format of a sent random access preamble and the correspondence table.

Correspondingly, another aspect of this application further provides a communications apparatus that can implement the foregoing communication method. For example, the communications apparatus may be a chip (such as a baseband chip or a communications chip) or a terminal device, and the foregoing method may be implemented by software or hardware, or by executing corresponding software by hardware.

In a possible implementation, a structure of the communications apparatus includes a processor and a memory. The processor is configured to support the apparatus in executing corresponding functions in the foregoing communication method. The memory is configured to be coupled to the processor, and stores a program (an instruction) and data that are necessary to the apparatus. Optionally, the communications apparatus may further include a communications interface, configured to support the apparatus in communicating with another network element.

In another possible implementation, the communications apparatus may include a processing unit and a sending unit. The processing unit is configured to implement a determining function in the foregoing method, and the sending unit is configured to implement a sending function in the foregoing method. For example, the processing unit is configured to determine transmission power for sending a random access preamble, where the transmission power is related to a random access preamble format and an offset based on the random access preamble format; and the sending unit is configured to send the random access preamble at the transmission power determined by the processing unit.

When the communications apparatus is a chip, the receiving unit may be an input unit such as an input circuit or a communications interface, and the sending unit may be an output unit such as an output circuit or a communications interface. When the communications apparatus is a terminal device, the receiving unit may be a receiver, and the sending unit may be a transmitter.

According to still another aspect, a communication method is provided, and includes: receiving, by a terminal device from a network device, information indicating a random access preamble format; receiving, by the terminal device from the network device, information used to indicate an offset based on the random access preamble format; determining, by the terminal device, transmission power for sending a random access preamble, where the transmission power is related to the information indicating the random access preamble format and the information indicating the offset based on the random access preamble format; and sending, by the terminal device, the random access preamble at the determined transmission power.

In a possible implementation, the determining, by the terminal device, transmission power for sending a random access preamble specifically includes: determining that the transmission power is a smaller value in the following two values: maximum transmission power allowed by the terminal device, and a sum of random access preamble target received power and a path loss $PL_c$ that is estimated by the terminal device; or determining that the transmission power is a smaller value in the following two values: maximum transmission power allowed by the terminal device, and a sum of random access preamble target received power, a subcarrier spacing power offset, and a value of at least one parameter in the following parameters, where the at least one parameter includes: the subcarrier spacing power offset, a random access preamble sequence offset, and a beam-related offset of the network device and/or the terminal device, where the random access preamble target received power is a sum of the following three parameters: random access preamble initial received target power, the offset based on the random access preamble format, and a product of a quantity of power ramping times minus 1 and a power ramping step.

In another possible implementation, the information used to indicate the offset based on the random access preamble format includes an index number of the offset based on the random access preamble format or a value of the offset based on the random access preamble format.

In still another possible implementation, values of the offset based on the random access preamble format include N elements, values of the N elements are distributed in equal difference, and N is a positive integer.

In still another possible implementation, values of the offset based on the random access preamble format include: {0 dB, −2 dB, −4 dB, −6 dB, −8 dB, −10 dB, −12 dB, −14 dB}, {8 dB, 6 dB, 4 dB, 2 dB, 0 dB, −2 dB, −4 dB, −6 dB}, or {19 dB, 17 dB, 15 dB, 13 dB, 11 dB, 9 dB, 7 dB, 5 dB}.

In yet another possible implementation, values of the offset based on the random access preamble format include M elements, values of the M elements are distributed in ascending or descending order, and M is a positive integer.

In yet another possible implementation, values of the offset based on the random access preamble format include: {0 dB, −3 dB, −4.5 dB, −6 dB, −8 dB, −11 dB, −14 dB}, {8 dB, 5 dB, 3.5 dB, 2 dB, 0 dB, −3 dB, −6 dB}, or {19 dB, 16 dB, 14.5 dB, 13 dB, 11 dB, 8 dB, 5 dB}.

Correspondingly, yet another aspect of this application further provides a communications apparatus that can implement the foregoing communication method. For example, the communications apparatus may be a chip (such as a baseband chip or a communications chip) or a terminal device, and the foregoing method may be implemented by software or hardware, or by executing corresponding software by hardware.

In a possible implementation, a structure of the communications apparatus includes a processor and a memory. The processor is configured to support the apparatus in executing corresponding functions in the foregoing communication method. The memory is configured to be coupled to the processor, and stores a program (an instruction) and data that are necessary to the apparatus. Optionally, the communications apparatus may further include a communications interface, configured to support the apparatus in communicating with another network element.

In another possible implementation, the communications apparatus may include a receiving unit, a processing unit, and a sending unit. The processing unit is configured to implement a determining function in the foregoing method, and the receiving unit and the sending unit are respectively configured to implement a receiving function and a sending function in the foregoing method. For example, the receiving unit is configured to receive, from a network device, information indicating a random access preamble format; the receiving unit is further configured to receive, from the network device, information used to indicate an offset based on the random access preamble format; the processing unit is configured to determine transmission power for sending a random access preamble, where the transmission power is related to the information indicating the random access preamble format and the information indicating the offset based on the random access preamble format; and the sending unit is configured to send the random access preamble at the determined transmission power.

When the communications apparatus is a chip, the receiving unit may be an input unit such as an input circuit or a communications interface, and the sending unit may be an output unit such as an output circuit or a communications interface. When the communications apparatus is a terminal device, the receiving unit may be a receiver (or may be referred to as a receiver), and the sending unit may be a transmitter (or may be referred to as a transmitter).

According to a further aspect, a communication method is provided, and includes: sending, by a network device to a terminal device, information indicating a random access preamble format; and receiving, by the network device, a random access preamble sent by the terminal device at determined transmission power, where the transmission power is related to the random access preamble format and an offset based on the random access preamble format.

In a possible implementation, the method further includes: sending, by the network device to the terminal device, information indicating the offset based on the random access preamble format.

In another possible implementation, the information used to indicate the offset based on the random access preamble format includes an index number of the offset based on the random access preamble format or a value of the offset based on the random access preamble format.

Correspondingly, this application further provides a communications apparatus that can implement the foregoing communication method. For example, the communications apparatus may be a chip (for example, a baseband chip or a communications chip) or a network device. The foregoing method may be implemented by software or hardware, or by executing corresponding software by hardware.

In a possible implementation, a structure of the communications apparatus includes a processor and a memory. The processor is configured to support the apparatus in executing corresponding functions in the foregoing communication method. The memory is configured to be coupled to the processor, and stores a program (an instruction) and/or data that are/is necessary to the apparatus. Optionally, the communications apparatus may further include a communications interface, configured to support the apparatus in communicating with another network element.

In another possible implementation, the communications apparatus may include a sending unit and a receiving unit. For example, the sending unit is configured to send, to a terminal device, information indicating a random access preamble format; and the receiving unit is configured to receive a random access preamble sent by the terminal device at determined transmission power, where the transmission power is related to the random access preamble format and an offset based on the random access preamble format.

When the communications apparatus is a chip, the sending unit may be an output unit such as an output circuit or a communications interface, and the receiving unit may be an input unit such as an input circuit or a communications interface. When the communications apparatus is a network device, the sending unit may be a transmitter or a transmitter, and the receiving unit may be a receiver or a receiver.

A still further aspect provides a computer readable storage medium. The computer readable storage medium stores an instruction, and when the instruction is run on a computer, the computer performs the methods in the foregoing aspects.

A yet further aspect provides a computer program product that includes an instruction. When the instruction is run on a computer, the computer performs the methods in the foregoing aspects.

BRIEF DESCRIPTION OF THE DRAWINGS

To describe the technical solutions in the embodiments of this application or in the background more clearly, the following briefly describes the accompanying drawings required for describing the embodiments of this application or the background.

DETAILED DESCRIPTION OF ILLUSTRATIVE EMBODIMENTS

Figure 1:
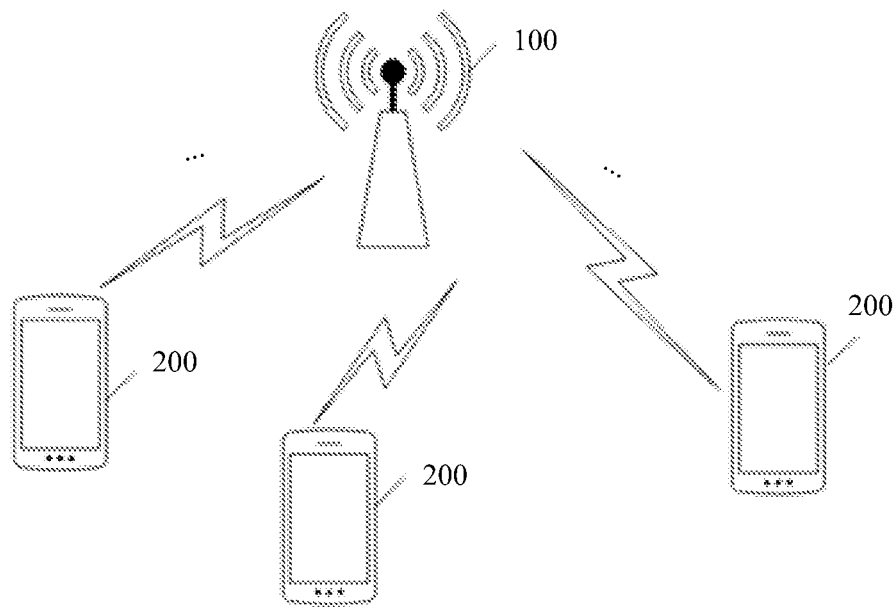
FIG. 1 is a schematic structural diagram of a communications system according to an embodiment of this application.

The following describes embodiments of this application with reference to the accompanying drawings.

In a Long Term Evolution (LTE) communications system, transmission power for radios is related to at least one of the following parameters: preamble initial received target power (preamble initial received target power), an offset based on the random access preamble format (the offset based on the random access preamble format may also be referred to as DELTA_PREAMBLE), a quantity of preamble transmission times (preamble transmission counter) that may also be referred to as a quantity of preamble power ramping times (preamble power ramping counter), a power ramping step (power ramping step), a path loss ($PL_c$) that is estimated by the terminal, and maximum transmission power ($P_{CMAX,c}(i)$) supported by the terminal.

DELTA_PREAMBLE is related to a random access preamble format. In the LTE, there are five random access preamble formats in total: 0 to 4, and parameters corresponding to each random access preamble format are shown in the following Table 1:

TABLE 1

Parameters of five random access preamble formats defined in LTE

| Random access preamble format | Sequence length | Subcarrier spacing | Cyclic prefix $T_{CP}$ | Preamble sequence $T_{SEQ}$ |
|---|---|---|---|---|
| 0 | 839 | 1.25 kHz | $3168T_s$ | $24576T_s$ |
| 1 | 839 | 1.25 kHz | $21024T_s$ | $24576T_s$ |
| 2 | 839 | 1.25 kHz | $6240T_s$ | $2 \cdot 24576T_s$ |
| 3 | 839 | 1.25 kHz | $21024T_s$ | $2 \cdot 24526T_s$ |
| 4 | 139 | 7.5 kHz | $448T_s$ | $4096T_s$ |

Correspondence between DELTA_PREAMBLE and random access preamble format is shown in the following Table 2:

TABLE 2

Correspondence between DELTA_PREAMBLE and random access preamble format in LTE

| Random access preamble format | DELTA_PREAMBLE |
|---|---|
| 0 | 0 dB |
| 1 | 0 dB |
| 2 | −3 dB |
| 3 | −3 dB |
| 4 | 8 dB |

In NR (New Radio), two types of random access preamble formats are defined.

One type of random access preamble format defined in the NR is shown in Table 3-1 and includes four random access preamble formats: formats 0 to 3.

TABLE 3-1

One type of random access preamble format defined in NR

| Preamble format | Sequence length L | Subcarrier spacing $\Delta f^{RA}$ | Absolute time length $N_u$ | Cyclic prefix time length $N_{CP}^{RA}$ |
|---|---|---|---|---|
| 0 | 839 | 1.25 kHz | 24576κ | 3168κ |
| 1 | 839 | 1.25 kHz | 2 · 24576κ | 21024κ |
| 2 | 839 | 1.25 kHz | 4 · 24576κ | 4688κ |
| 3 | 839 | 5 kHz | 24576κ | 3168κ |

In Table 3-1, a random access preamble sequence length L corresponding to a random access preamble format is 839.

The time lengths $N_u$ of the formats 0 to 3 implicitly include a guard time, and u is a subcarrier spacing index of current uplink/downlink data, and is fixed to 0 in Table 3-1. A time length of a preamble format includes three parts: a cyclic prefix, a preamble sequence, and a guard time (this time period is implicitly included). Time lengths of the format 0 and the format 3 are approximately 1 ms (which is the same as a time length of a preamble format 1 in the LTE), but subcarrier spacings of the format 0 and the format 3 are 4 times different (correspondingly, frequency domain bandwidth is respectively 1.25×864 kHz and 5×864 kHz that are 4 times different). A time length of the format 1 is approximately 3 ms (which is the same as a time length of a preamble format 3 in the LTE). A time length of the format 2 is approximately 3.5 ms.

The other type of random access preamble format defined in the NR is shown in Table 3-2, and includes 10 random access preamble formats that are separately obtained through repeating different quantities of preamble orthogonal frequency division multiplexing (OFDM) symbols (that is, a second column in Table 3-2).

values are separately used in different scenarios. The absolute time lengths $N_u$ of the formats A1, A2, and A3 are respectively the same as the absolute time lengths $N_u$ of the formats B1, B2, and B3, but the cyclic prefix (cyclic prefix, CP) time lengths ($N_{CP}^{RA}$) of the formats A1, A2, and A3 are different from the cyclic prefix time lengths of the formats B1, B2, and B3. The formats B1, B2, and B3 implicitly include a guard time. To be specific, CP lengths of the three random access preamble formats B1, B2, and B3 are respectively shorter than CPs of A1, A2, and A3, and this implicitly indicates that the guard time is implemented through reducing the CP length in these formats. However, B1, B2, and B3 respectively have a slight difference from A1, A2, and A3 in terms of a coverage range or a coverage capability.

In Table 3-1 and Table 3-2, time units of the cyclic prefix $N_{CP}^{RA}$ and the absolute time length $N_u$ are Tc, and κ is a

TABLE 3-2

The other type of random access preamble format defined in NR

| Preamble format | Quantity of OFDM symbols | Sequence length L | Subcarrier spacing $\Delta f^{RA}$ | Absolute time length $N_u$ | Cyclic prefix time length $N_{CP}^{RA}$ |
|---|---|---|---|---|---|
| A0 | 1  | [127 or 139] | $15 \cdot 2^\mu$ kHz | $2048\kappa \cdot 2^{-\mu}$ | $144\kappa \cdot 2^{-\mu}$ |
| A1 | 2  | [127 or 139] | $15 \cdot 2^\mu$ kHz | $2 \cdot 2048\kappa \cdot 2^{-\mu}$ | $288\kappa \cdot 2^{-\mu}$ |
| A2 | 4  | [127 or 139] | $15 \cdot 2^\mu$ kHz | $4 \cdot 2048\kappa \cdot 2^{-\mu}$ | $576\kappa \cdot 2^{-\mu}$ |
| A3 | 6  | [127 or 139] | $15 \cdot 2^\mu$ kHz | $6 \cdot 2048\kappa \cdot 2^{-\mu}$ | $864\kappa \cdot 2^{-\mu}$ |
| B1 | 2  | [127 or 139] | $15 \cdot 2^\mu$ kHz | $2 \cdot 2048\kappa \cdot 2^{-\mu}$ | $216\kappa \cdot 2^{-\mu}$ |
| B2 | 4  | [127 or 139] | $15 \cdot 2^\mu$ kHz | $4 \cdot 2048\kappa \cdot 2^{-\mu}$ | $360\kappa \cdot 2^{-\mu}$ |
| B3 | 6  | [127 or 139] | $15 \cdot 2^\mu$ kHz | $6 \cdot 2048\kappa \cdot 2^{-\mu}$ | $504\kappa \cdot 2^{-\mu}$ |
| B4 | 12 | [127 or 139] | $15 \cdot 2^\mu$ kHz | $12 \cdot 2048\kappa \cdot 2^{-\mu}$ | $936\kappa \cdot 2^{-\mu}$ |
| C0 | 1  | [127 or 139] | $15 \cdot 2^\mu$ kHz | $2048\kappa \cdot 2^{-\mu}$ | $1240\kappa \cdot 2^{-\mu}$ |
| C2 | 4  | [127 or 139] | $15 \cdot 2^\mu$ kHz | $4 \cdot 2048\kappa \cdot 2^{-\mu}$ | $2048\kappa \cdot 2^{-\mu}$ |

In Table 3-2, a random access preamble sequence length L corresponding to a random access preamble format is 127 or 139. The random access preamble format of this length has four subcarrier spacings $\Delta f^{RA}$: 15 kHz, 30 kHz, 600 kHz, and 120 kHz (μ=0, 1, 2, and 3, and is a subcarrier spacing index of a preamble format). 15 kHz and 30 kHz are used in a scenario in which a carrier frequency is less than 6 GHz, and 60 kHz and 120 kHz are used in a scenario in which a carrier frequency is greater than 6 GHz. In 10 random access preamble formats of a subcarrier spacing, a total of seven different quantities of preamble OFDM symbol repetition multiple factor of a relative reference time unit. For example, the reference time unit Ts=1/(15×1000×2048) seconds, Tc=1/(480×1000×4096) seconds, and corresponding κ=Ts/Tc, in other words, κ=64.

It should be noted that Table 3-2 provides 10 random access formats included in the 3rd Generation Partnership Project (3GPP) release 15 (R15). In other releases, the foregoing random access formats may be decreased or increased, and this is not limited herein. For example, Table 3-3 includes nine preamble formats.

TABLE 3-3

The other type of random access preamble format defined in NR

| Preamble format | Quantity of OFDM symbols | Sequence length L | Subcarrier spacing $\Delta f^{RA}$ | Absolute time length $N_u$ | Cyclic prefix time length $N_{CP}^{RA}$ |
|---|---|---|---|---|---|
| A1 | 2  | [127 or 139] | $15 \cdot 2^\mu$ kHz | $2 \cdot 2048\kappa \cdot 2^{-\mu}$ | $288\kappa \cdot 2^{-\mu}$ |
| A2 | 4  | [127 or 139] | $15 \cdot 2^\mu$ kHz | $4 \cdot 2048\kappa \cdot 2^{-\mu}$ | $576\kappa \cdot 2^{-\mu}$ |
| A3 | 6  | [127 or 139] | $15 \cdot 2^\mu$ kHz | $6 \cdot 2048\kappa \cdot 2^{-\mu}$ | $864\kappa \cdot 2^{-\mu}$ |
| B1 | 2  | [127 or 139] | $15 \cdot 2^\mu$ kHz | $2 \cdot 2048\kappa \cdot 2^{-\mu}$ | $216\kappa \cdot 2^{-\mu}$ |
| B2 | 4  | [127 or 139] | $15 \cdot 2^\mu$ kHz | $4 \cdot 2048\kappa \cdot 2^{-\mu}$ | $360\kappa \cdot 2^{-\mu}$ |
| B3 | 6  | [127 or 139] | $15 \cdot 2^\mu$ kHz | $6 \cdot 2048\kappa \cdot 2^{-\mu}$ | $504\kappa \cdot 2^{-\mu}$ |
| B4 | 12 | [127 or 139] | $15 \cdot 2^\mu$ kHz | $12 \cdot 2048\kappa \cdot 2^{-\mu}$ | $936\kappa \cdot 2^{-\mu}$ |
| C0 | 1  | [127 or 139] | $15 \cdot 2^\mu$ kHz | $2048\kappa \cdot 2^{-\mu}$ | $1240\kappa \cdot 2^{-\mu}$ |
| C2 | 4  | [127 or 139] | $15 \cdot 2^\mu$ kHz | $4 \cdot 2048\kappa \cdot 2^{-\mu}$ | $2048\kappa \cdot 2^{-\mu}$ |

In addition, a definition of transmission power is provided as follows:

The transmission power is also referred to as output power, and can be defined as output power measured on all or some supported frequencies, frequency bands, or bandwidth in a given time length and/or period. For example, a measurement time is at least 1 ms. For another example, a measurement time is at least one timeslot corresponding to a subcarrier spacing. In an example, power obtained in a measurement time of at least 1 ms is used.

FIG. 1 is a schematic diagram of a communications system. The communications system may include at least one network device 100 (only one is shown) and one or more terminal devices 200 connected to the network device 100.

The network device wo may be any device with a wireless sending/receiving function. The device includes but is not limited to a base station (for example, a NodeB, an evolved NodeB (eNodeB), a base station in a 5th Generation (5G) communications system, and a base station or a network device in a future communications system) and the like. The network device wo may be alternatively a radio controller in a cloud radio access network (CRAN) scenario. The network device wo may be alternatively a wearable device, an in-vehicle device, or the like. The network device wo may be alternatively a small cell, a transmit-receive node (TRP), or the like. Certainly, this application is not limited thereto.

The terminal device 200 is a device with a wireless sending/receiving function, and may be deployed on land and includes an indoor or outdoor device, a hand-held device, a wearable device, or an in-vehicle device, or may be deployed on a water surface (for example, a ship), or may be deployed in the air (for example, an airplane, a balloon, or a satellite). The terminal device may be a mobile phone, a tablet computer (Pad), a computer with a wireless sending/receiving function, a virtual reality (VR) terminal device, an augmented reality (AR) terminal device, a wireless terminal in industrial control, a wireless terminal in self driving, a wireless terminal in telemedicine (remote medical), a wireless terminal in a smart grid, a wireless terminal in transportation safety, a wireless terminal in a smart city, a wireless terminal in a smart home, or the like. An application scenario is not limited in the embodiments of this application. The terminal device may sometimes be referred to as user equipment (UE), a terminal, an access terminal device, a UE unit, a UE station, a mobile station, a remote station, a remote terminal device, a mobile device, a UE terminal device, a terminal device, a wireless communications device, a UE agent, a UE apparatus, or the like.

It should be noted that the terms "system" and "network" may be used interchangeably in the embodiments of this application. The term "a plurality of" means two or more than two. In view of this, the term "a plurality of" may also be understood as "at least two" in the embodiments of this application. The term "and/or" describes an association relationship for describing associated objects and represents that three relationships may exist. For example, A and/or B may represent the following three cases: Only A exists, both A and B exist, and only B exists. In addition, the character "/" usually represents an "or" relationship between the associated objects unless specified otherwise.

In this application, a subcarrier spacing SCS or a corresponding subcarrier spacing index u may be represented as $SCS=15 \times 2^u$ when the SCS is not less than 15 kHz. for example, the SCS may be any one of the following: 15 kHz, 30 kHz, 60 kHz, 120 kHz, 24 kHz, 480 kHz, 960 kHz, 1920 kHz, 384 kHz, . . . . Correspondingly, u may be any real number or integer, for example, 0, 1, 2, 3, 4, 5, 6, 7, 8, 9, 10, 11, 12, 13, 14, 15, 16, . . . . The solution in this application may also be applied to another subcarrier spacing value, and this is not limited herein.

In this application, an offset that is based on a random access preamble format may also be referred to as a power offset based on the random access preamble format, a power offset, or an offset.

In this application, a random access resource may be a random access time and frequency resource, or may be a random access preamble set on a random access time and frequency resource, or may be a random access occasion (RO). The RO is a time and frequency resource used for sending a random access preamble.

In this application, $P_{PRACH}$ represents a transmission power of a random access preamble, or represents transmission power for a carrier of a serving cell determined by a terminal (namely, transmission power for a physical random access channel (PRACH) for carrier f of serving cell c in transmission period i). $P_{CMAX,c}(i)$ represents a maximum transmission power supported by the terminal or a maximum transmission power configured for the terminal, or a configured terminal transmission power for the carrier of the serving cell (namely, configured UE transmission power for carrier f of serving cell c within transmission period i). PREAMBLE_RECEIVED_TARGET_POWER represents a random access preamble target received power, and represents received power that can be obtained by a network device side when a terminal device correctly estimates a path loss. $PL_c$ represents the path loss estimated by the terminal device. The terminal device may obtain $PL_c$ based on transmission power of a reference signal from a network device and received signal quality (for example, reference signal received power (RSRP)) of the terminal device. For example, $PL_c$=referenceSignalPower−higher layer filtered RSRP, where referenceSignalPower is transmission power of the reference signal (for example, a synchronization signal SS/PBCH block) sent by the network device, and higher layer filtered RSRP is the received signal quality of the terminal device. PreambleInitialReceivedTargetPower is preamble initial received target power, and indicates power of a random access preamble that is expected to be received by the network device in initial preamble transmission or an initial quantity of power ramping times of the terminal device. DELTA_PREAMBLE is an offset based on a random access preamble format. When different random access preamble formats correspond to different values of DELTA_PREAMBLE, this parameter may be used to compensate for a difference in preamble target received power that is caused by the random access preamble formats, or DELTA_PREAMBLE is indicated by network device configuration information, so that greater flexibility is achieved. PREAMBLE_POWER_RAMPING_COUNTER is a quantity of power ramping times, and powerRampingStep is a power ramping step. Based on a value of the power ramping step, different performance of a base station in random access preamble detection can be achieved when different preamble transmission times or different power ramping times are used. For example, when there are a relatively small quantity of terminal devices in a cell, the network device may configure a relatively large power ramping step, to improve a correctness probability of preamble retransmission and reduce a random access latency. For another example, when there are a relatively large quantity of terminal devices in a cell, the network device may configure relatively small power ramping compensation, to reduce mutual interference between terminal devices.

Figure 2:
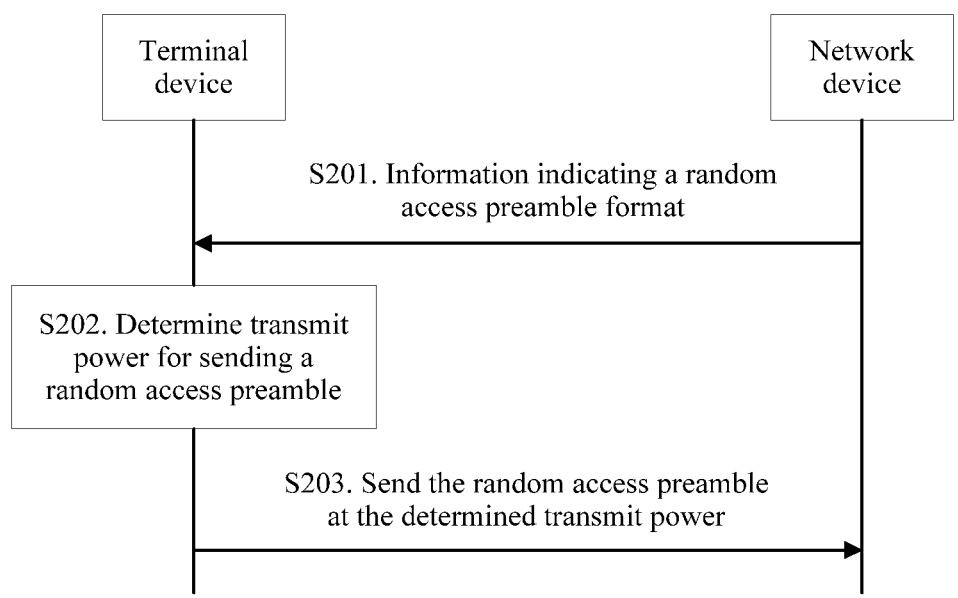
FIG. 2 is a schematic diagram of an interaction procedure of a communication method according to an embodiment of this application.

FIG. 2 is a schematic diagram of an interaction procedure of a communication method according to an embodiment of this application. The method may include the following steps:

S201: A network device sends, to a terminal device, information indicating a random access preamble format, and the terminal device receives the information indicating the random access preamble format.

S202: The terminal device determines transmission power for sending a random access preamble, where the transmission power is associated with the random access preamble format and an offset DELTA_PREAMBLE based on the random access preamble format.

S203: The terminal device sends the random access preamble at the determined transmission power, and the network device receives the random access preamble sent by the terminal device.

for example, in S201, in a random access process, the network device sends a random access configuration parameter by using a message. The message may be a radio resource control (RRC) message, system information (SI), remaining minimum system information (RMSI), an NR system information block 0 (NR SIB 0), an NR system information block 1 (NR SIB 1), a medium access control-control element (MAC CE) message, downlink control information (DCI), a physical broadcast channel (PBCH), a physical downlink control channel order (PDCCH order), or the like.

The random access configuration parameter may include the information indicating the random access preamble format. For example, a base station configures a random access configuration index (index) in the RRC message or the system information (SI), and the terminal device may obtain information such as the random access preamble format and time and/or a frequency of a random access resource based on a preset/preconfigured random access configuration table and the random access configuration index configured by the base station. In practice, manners for obtaining the random access preamble format are not limited to the foregoing manners, and the network device may configure more parameters for random access.

In this embodiment, random access preamble formats include 0 to 3, A0 to A3, B1 to B4, C0, and C2. It should be noted that, the random access preamble formats may be increased or decreased based on a requirement. To be specific, the terminal device sends random access preambles corresponding to random access preamble formats obtained after the random access preamble formats are increased or decreased, for example, deletes the preamble format A0 or adds a new preamble format. This is not limited in this application.

That the terminal device determines transmission power for sending a random access preamble in S202 includes:

determining that the transmission power is a smaller value in the following two values: a maximum transmission power $P_{CMAX,c}(i)$ allowed by the terminal device, and a sum of random access preamble target received power and a path loss PLc that is estimated by the terminal device; or determining that the transmission power is a smaller value in the following two values: a maximum transmission power allowed by the terminal device, and a sum of random access preamble target received power, a subcarrier spacing power offset, PLc, and a value of at least one parameter in the following parameters, where the at least one parameter includes: the subcarrier spacing power offset f(SCS), a random access preamble sequence offset h(L), and a beam-related offset G of the network device and/or the terminal device, where the random access preamble target received power is a sum of the following three parameters: random access preamble initial received target power, the offset based on the random access preamble format, and a product of a quantity of power ramping times (PREAMBLE_POWER_RAMPING_COUNTER) minus 1 and a power ramping step.

in an implementation, the terminal device may determine the transmission power of the random access preamble in accordance with a formula (1). The formula (1) is as follows:

$P_{PRACH}=\min\{P_{CMAX,c}(i),\text{PREAMBLE\_RECEIVED\_TARGET\_POWER}+PL_c\}\_[\text{dBm}]$   Formula (1), where PREAMBLE_RECEIVED_TARGET_POWER=preambleInitialReceivedTargetPower+DELTA_PREAMBLE+(PREAMBLE_POWER_RAMPING_COUNTER−1)×powerRampingStep.

In an implementation, at least one of the following parameters is a preset/default/initially-set value: $P_{CMAX,c}(i)$, the preamble initial received target power, DELTA_PREAMBLE, preamble transmission times, power ramping times, and the power ramping step. For example, $P_{CMAX,c}(i)$ is 23 dBm by default or is preset to 23 dBm. For another example, the preamble initial received target power is −90 dBm by default or is preset to −90 dBm. For another example, the power ramping step is 2 dB by default or is preset to 2 dB. For another example, DELTA_PREAMBLE is 2 dB by default or is preset to 2 dB. For another example, the quantity of preamble transmission times is initialized to 1. For another example, the quantity of power ramping times is initialized to 1.

In an implementation, the power ramping times are related to the preamble transmission times. For example, the power ramping times are the preamble transmission times. For another example, the power ramping times are less than or equal to the preamble transmission times. For another example, power ramping times=floor(preamble transmission times/K), where K is a preset or preconfigured constant. After determining the transmission power, the terminal device sends the random access preamble based on the transmission power. For a specific implementation process, refer to conventional solutions. After the network device receives the random access preamble sent by the terminal device at the determined transmission power, the network device determines power of an obtained random access preamble receive signal based on the formula (1). for example, when the path loss is correctly estimated, power of a random access preamble receive signal that can be obtained by the network device is the random access preamble target received power.

In another implementation, based on the formula (1), the transmission power may further be associated with the subcarrier-spacing-based power offset f(SCS). For example, a larger subcarrier spacing leads to a shorter time length of a random access preamble corresponding to a same random access preamble format, and to implement same detection performance, a larger corresponding transmission power offset needs to be used. for example, the terminal device may determine the transmission power of the random access preamble based on a formula (2). The formula (2) is as follows:

$P_{PRACH}=\min\{P_{CMAX,c}(i),\text{PREAMBLE\_RECEIVED\_TARGET\_POWER}+f(SCS)+PL_c\}\_[\text{dBm}]$, where PREAMBLE_RECEIVED_TARGET_POWER is the same as PREAMBLE_RECEIVED_TARGET_POWER in the formula (1).

SCS represents a subcarrier spacing, and f(SCS) represents the subcarrier-spacing-based power offset. For example, f(SCS)=round(10×log$_{10}$(SCS/SCS0)), where SCS0 represents a reference subcarrier spacing.

For example, when the reference subcarrier spacing SCS0=1.25 kHz and SCS=15 kHz, the power offset f(SCS)=8 dB.

For another example, when the reference subcarrier spacing SCS0=1.25 kHz and SCS=30 kHz, the power offset f(SCS)=11 dB.

For another example, when the reference subcarrier spacing SCS0=1.25 kHz and SCS=60 kHz, the power offset f(SCS)=17 dB.

For another example, when the reference subcarrier spacing SCS0=1.25 kHz and SCS=120 kHz, the power offset f(SCS)=20 dB.

For another example, when the reference subcarrier spacing SCS0=15 kHz and SCS=30 kHz, the power offset f(SCS)=3 dB.

For another example, when the reference subcarrier spacing SCS0=15 kHz and SCS=60 kHz, the power offset f(SCS)=6 dB.

For another example, when the reference subcarrier spacing SCS0=15 kHz and SCS=120 kHz, the power offset f(SCS)=9 dB. Meanings of other parameters are the same as those in the formula (1).

After determining the transmission power, the terminal device sends the random access preamble in accordance with the transmission power. For a specific implementation process, refer to conventional solutions. After the network device receives the random access preamble sent by the terminal device at the determined transmission power, the network device determines power of an obtained random access preamble receive signal based on the formula (2). For example, when the path loss is correctly estimated, power of a random access preamble receive signal that is obtained by the network device is a sum of the random access preamble target received power and f(SCS).

In a still another implementation, based on the formula (1), the transmission power may further be related to an offset h(L) that is based on a random access preamble sequence.

The offset h(L) that is based on the random access preamble sequence is an offset corresponding to a random access preamble sequence length.

For example, a shorter random access preamble sequence leads to a smaller gain that can be obtained during sequence detection, and to implement same detection performance, a larger corresponding transmission power offset needs to be used. for example, the terminal device may determine the transmission power of the random access preamble based on a formula (3). The formula (3) is as follows:

$$P_{PRACH}=\min\{P_{CMAX,c}(i), \text{PREAMBLE\_RECEIVED\_TARGET\_POWER}+h(L)+PL_c\}\_[\text{dBm}], \text{ where}$$

PREAMBLE_RECEIVED_TARGET_POWER is the same as PREAMBLE_RECEIVED_TARGET_POWER in the formula (1).

L is the random access preamble sequence length, and h(L) is the offset that is based on the random access preamble sequence. For example, h(L)=round (10×log$_{10}$(L/L0)), where L0 is a reference random access preamble sequence length.

For example, L0=839, L=139, and h(L)=−8 dB.
For another example, L0=139, L=839, and h(L)=8 dB.
For another example, L0=127, L=839, and h(L)=8 dB.
For another example, L0=71, L=139, and h(L)=3 dB.
For another example, L0=31, L=139, and h(L)=7 dB.

Meanings of other parameters are the same as those in the formula (1).

After determining the transmission power, the terminal device sends the random access preamble based on the transmission power. For a specific implementation process, refer to the prior art. After the network device receives the random access preamble sent by the terminal device at the determined transmission power, the network device determines power of an obtained random access preamble receive signal based on the formula (3). for example, when the path loss is correctly estimated, power of a random access preamble receive signal that is obtained by the network device is a sum of the random access preamble target received power and h(L).

In yet another implementation, based on the formula (1), the transmission power is further related to the beam-related offset G of the network device and/or the terminal device.

for example, the terminal device may determine the transmission power of the random access preamble based on a formula (4). The formula (4) is as follows:

$$P_{PRACH}=\min\{P_{CMAX,c}(i), \text{PREAMBLE\_RECEIVED\_TARGET\_POWER}+G+PL_c\}\_[\text{dBm}], \text{ where}$$

PREAMBLE_RECEIVED_TARGET_POWER is the same as PREAMBLE_RECEIVED_TARGET_POWER in the formula (1).

For example, G is a difference between a downlink signal transmit beam gain of the network device and a random access preamble signal receive beam gain of the network device. For example, G=Transmit beam gain−Receive beam gain.

For another example, G is related to a quantity $N_b$ of receive beams of the network device in the random access preamble, for example, G=round(−10×log$_{10}$ $N_b$). For example, when $N_b$=1, G=0 dB; when $N_b$=2, G=3 dB; when $N_b$=3, G=5 dB; and when $N_b$=4, G=6 dB.

For another example, G is a difference between a downlink signal receive beam gain of the terminal device and a random access preamble signal transmit beam gain of the terminal device.

For another example, G includes at least two of the following parameters: a difference between a downlink signal transmit beam gain of the network device and a random access preamble signal receive beam gain of the network device, a difference between a downlink signal receive beam gain of the terminal device and a random access preamble signal transmit beam gain of the terminal device, and a quantity of receive beams of the network device in the random access preamble.

The difference between the downlink signal transmit beam gain of the network device and the random access preamble signal receive beam gain of the network device may be configured by the network device, or may be obtained according to a preset rule and/or based on a parameter configured by the network device.

For example, better beam directivity or a higher gain leads to stronger signal strength that can be obtained, so that the transmission power of the random access preamble can be lower.

After determining the transmission power, the terminal device sends the random access preamble based on the transmission power. For a specific implementation process, refer to the prior art. After the network device receives the random access preamble sent by the terminal device at the determined transmission power, the network device determines power of an obtained random access preamble receive signal based on the formula (4). for example, when the path loss is correctly estimated, power of a random access preamble receive signal that can be obtained by the network device is a sum of the random access preamble target received power and G.

In a further implementation, based on the formula (1), the transmission power may be further related to f(SCS) and h(L), and the transmission power may be determined based on a formula (5):

$$P_{PRACH}=\min\{P_{CMAX,c}(i), \text{PREAMBLE\_RECEIVED\_TARGET\_POWER}+f(SCS)+h(L)+PL_c\}\_[\text{dBm}],$$

where

PREAMBLE_RECEIVED_TARGET_POWER is the same as PREAMBLE_RECEIVED_TARGET_POWER in the formula (1).

After determining the transmission power, the terminal device sends the random access preamble based on the transmission power. For a specific implementation process, refer to the prior art. After the network device receives the random access preamble sent by the terminal device at the determined transmission power, the network device determines power of an obtained random access preamble receive signal based on the formula (5). for example, when the path loss is correctly estimated, power of a random access preamble receive signal that can be obtained by the network device is a sum of the random access preamble target received power, f(SCS), and h(L).

In a still further implementation, based on the formula (1), the transmission power may be further related to f(SCS) and G, and the transmission power may be determined based on a formula (6):

$$P_{PRACH}=\min\{P_{CMAX,c}(i), \text{PREAMBLE\_RECEIVED\_TARGET\_POWER}+f(SCS)+G+PL_c\}\_[\text{dBm}],$$

where

PREAMBLE_RECEIVED_TARGET_POWER is the same as PREAMBLE_RECEIVED_TARGET_POWER in the formula (1).

After determining the transmission power, the terminal device sends the random access preamble based on the transmission power. For a specific implementation process, refer to the prior art. After the network device receives the random access preamble sent by the terminal device at the determined transmission power, the network device determines power of an obtained random access preamble receive signal based on the formula (6). for example, when the path loss is correctly estimated, power of a random access preamble receive signal that can be obtained by the network device is a sum of the random access preamble target received power, f(SCS), and G.

In a yet further implementation, based on the formula (1), the transmission power may be further related to G and h(L), and the transmission power may be determined based on a formula (7):

$$P_{PRACH}=\min\{P_{CMAX,c}(i), \text{PREAMBLE\_RECEIVED\_TARGET\_POWER}+G+h(L)+PL_c\}\_[\text{dBm}],$$

where

PREAMBLE_RECEIVED_TARGET_POWER is the same as PREAMBLE_RECEIVED_TARGET_POWER in the formula (1).

After determining the transmission power, the terminal device sends the random access preamble based on the transmission power. For a specific implementation process, refer to the prior art. After the network device receives the random access preamble sent by the terminal device at the determined transmission power, the network device determines power of an obtained random access preamble receive signal based on the formula (7). for example, when the path loss is correctly estimated, power of a random access preamble receive signal that can be obtained by the network device is a sum of the random access preamble target received power, G, and h(L).

In a still yet further implementation, based on the formula (1), the transmission power may be further related to f(SCS), G, and h(L), and the transmission power may be determined based on a formula (8):

$$P_{PRACH}=\min\{P_{CMAX,c}(i), \text{PREAMBLE\_RECEIVED\_TARGET\_POWER}+f(SCS)+h(L)+G+PL_c\}\_[\text{dBm}],$$

where

PREAMBLE_RECEIVED_TARGET_POWER is the same as PREAMBLE_RECEIVED_TARGET_POWER in the formula (1).

It should be noted that any one or more of the following parameters in the formula (1) to the formula (8): f(SCS), h(L), and G may also be placed in a formula corresponding to PREAMBLE_RECEIVED_TARGET_POWER. In other words, same transmission power $P_{PRACH}$ is finally obtained in both manners.

After determining the transmission power, the terminal device sends the random access preamble based on the transmission power. For a specific implementation process, refer to the prior art. After the network device receives the random access preamble sent by the terminal device at the determined transmission power, the network device determines power of an obtained random access preamble receive signal based on the formula (8). for example, when the path loss is correctly estimated, power of a random access preamble receive signal that is obtained by the network device is a sum of the random access preamble target received power, f(SCS), G, and h(L).

In still another implementation, PREAMBLE_RECEIVED_TARGET_POWER in the foregoing formula (1) to formula (8) may be alternatively determined in the following manner:

PREAMBLE_RECEIVED_TARGET_POWER=preambleInitialReceivedTargetPower+(PREAMBLE_POWER_RAMPING_COUNTER−1)×powerRamping-Step.

In other words, the random access preamble target received power is a sum of the following two parameters: the random access preamble initial received target power and the product of the quantity of power ramping times (PREAMBLE_POWER_RAMPING_COUNTER, for example, initialized to 1) minus 1 and the power ramping step. In this implementation, implementation flexibility of the network device can be implemented by using a relatively large selection range of preambleInitialReceivedTargetPower. Preamble detection performance (for example, a preamble receive signal-to-noise ratio or receive power) that can be obtained by the network device in different preamble formats may be inconsistent, but a selection range provided by each preamble format is large enough or relatively large.

In an implementation, at least one of the following parameters in the foregoing formula 1 to formula 8 is configured by the network device or is obtained based on network device configuration information: $P_{CMAX,c}(i)$, the preamble initial received target power, DELTA_PREAMBLE, and the power ramping step.

For the foregoing formula 1 to formula 8, each random access preamble format has corresponding DELTA_PREAMBLE, and different preamble formats may correspond to a same offset or different offsets.

for example, in an implementation, the terminal device may store the following Table 4a, obtain DELTA_PREAMBLE based on Table 4a, and then calculate the transmission power based on any one of the foregoing formula 1 to formula 8.

As shown in Table 4a, DELTA_PREAMBLE corresponding to all or some random access preamble formats may be related to a preset value X. Table 4a shows the correspondence between a random access preamble format and DELTA_PREAMBLE.

TABLE 4a

| Random access preamble format | DELTA_PREAMBLE(dB) |
| --- | --- |
| 0 | 0 dB |
| 1 | −3 dB |
| 2 | −6 dB |
| 3 | 0 dB |
| A0 | X + 0 dB |
| A1 | X − 3 dB |
| A2 | X − 6 dB |
| A3 | X − 8 dB |
| B1 | X − 3 dB |
| B2 | X − 6 dB |
| B3 | X − 8 dB |
| B4 | X − 11 dB |
| C0 | X + 0 dB |
| C2 | X − 6 dB |

In Table 4a, X is an integer or a decimal. A value of X may be received from the network device. A value range of X may be −100 to 100.

It should be further noted that the random access preamble formats in Table 4a may be decreased or increased. For example, A0 is deleted, or a new preamble format C3 is added. This is not limited herein.

for example, the value of X may be 0, 3, 8, 11, 14, 17, 18, 19, or 20.

for example, X is configured by the network device as follows:

DeltaPreamblePowerOffset ENUMERATED{dB 11,dB 14,dB 17,dB 20}OPTIONAL

For another example, X is related to both a frequency band on which a random access resource is located and a configuration value of the network device. For example, X=X1+X2, where X1 is related to the frequency band on which the random access resource is located. for example, when a carrier on which the random access resource is located is less than C1 GHz, X1=11 dB; otherwise, X1=17 dB. X2 is configured by a network as follows:

DeltaPreamblePowerOffset ENUMERATED{dB0, dB3} OPTIONAL, where dB $n$ represents $n$ decibels.

In an implementation, the terminal device pre-stores a correspondence between Random access preamble format and DELTA_PREAMBLE(dB) as shown in table 4b the terminal obtains DELTA_PREAMBLE based on Table 4b, and then calculates the transmission power based on any one of the foregoing formula 1 to formula 8. W(0), W(1), . . . , and W(9) in Table 4b are preset or configured constants, and values of W(0), W(1), . . . , and W(9) are [−100, 100] that indicates any number from −100 to 100.

TABLE 4b

| Random access preamble format | DELTA_PREAMBLE(dB) |
| --- | --- |
| 0 | 0 dB |
| 1 | −3 dB |
| 2 | −6 dB |
| 3 | 0 dB |
| A0 | W(0) dB |
| A1 | W(1) dB |
| A2 | W(2) dB |
| A3 | W(3) dB |
| B1 | W(4) dB |
| B2 | W(5) dB |
| B3 | W(6) dB |
| B4 | W(7) dB |
| C0 | W(8) dB |
| C2 | W(9) dB |

In the implementation corresponding to Table 4b, W(0)=W(8), W(1)=W(4), W(2)=W(5)=W(9), and W(3)=W(6). In other words, random access preamble formats of a same time length/quantity of OFDM symbols may correspond to a same offset.

In the implementation corresponding to Table 4b, W(i)=W(0)+F(i), where i=1, 2, 3, . . . , 9. To be specific, W(1)=W(0)+F(1), W(2)=W(0)+F(2), W(3)=W(0)+F(3), W(4)=W(0)+F(4), W(5)=W(0)+F(5), W(6)=W(0)+F(6), W(7)=W(0)+F(7), W(8)=W(0)+F(8), and W(9)=W(0)+F(9).

For another example, W(0)=W(8), or F(8)=0.

For another example, W(1)=W(4), or F(1)=F(4).

For another example, W(2)=W(5)=W(9), or F(2)=F(5)=F(9).

For another example, W(3)=W(6), or F(3)=F(6).

In another implementation, F(3)≤F(2)≤F(1) and/or F(7)≤F(6)≤F(5)≤F(4) and/or F(9)≤F(8); or W(3)≤W(2)≤W(1)≤W(0) and/or W(7)≤W(6)≤W(5)≤W(4) and/or W(9)≤W(8).

In another implementation, a value range of F(1) is [−3, 0], and/or a value range of F(2) is [−6, 0], and/or a value range of F(3) is [−8, 0], and/or a value range of F(4) is [−3, 0], and/or a value range of F(5) is [−6, 0], and/or a value range of F(6) is [−8, 0], and/or a value range of F(7) is [−11, 0], and/or a value range of F(9) is [−6, 0]. For another example, F(1)=−1.5, F(2)=−3, F(3)=−4, F(4)=−1.5, F(5)=−3, F(6)=−4, F(7)=−5.5, F(8)=0, and F(9)=−3. In other words, W(1)=W(0)−1.5, W(2)=W(0)−3, W(3)=W(0)−4, W(4)=W(0)−1.5, W(5)=W(0)−3, W(6)=W(0)−4, W(7)=W(0)−5, W(8)=W(0), and W(9)=W(0)−3.

In another implementation, W(i)=W, where i=0, 1, 2, 3, . . . , 9. In other words, the random access preamble formats A0, A1, A2, A3, B1, B2, B3, B4, C0, and C2 correspond to a same power offset. In an implementation, a same W value is used for all preamble formats, so that it can be ensured that same performance is obtained in some implementations (for example, only one preamble sequence OFDM symbol is received in one base station beam), in other words, receive performance (for example, a receive signal-to-noise ratio, for example, a preamble sequence detection correctness probability in a receive beam) obtained by the network device for all the preamble formats is consistent. For another example, W=0 dB.

It should be understood that this embodiment supports a plurality of manners in which the base station receives the random access preamble. For example, the base station performs receive beam scanning in the random access preamble, and the terminal does not need to obtain a receiving manner of the base station.

In an implementation, a value of at least one of W(0), W(1), . . . , W(9), F(1), . . . , and F(9) is related to a subcarrier spacing and/or a carrier frequency. The subcarrier spacing may be at least one of the following: a subcarrier spacing of a random access preamble, a subcarrier spacing of an uplink bandwidth part, a subcarrier spacing of a random access message 3, a subcarrier spacing of a downlink signal, and a subcarrier spacing of a downlink access bandwidth part. For example, when the subcarrier spacing is a first value (for example, SCS=15 kHz), W(0)=11. For another example, when the subcarrier spacing is a second value (for example, SCS=30 kHz), W(0)=14. For another example, when the subcarrier spacing is a third value (for example, SCS=60 kHz), W(0)=17. For another example, when the subcarrier spacing is a fourth value (for example, SCS=120 kHz), W(0)=20. For another example, as shown in Table 4c, tt can be understood that W(1), . . . , W(9), F(1), . . . , and F(9) may also have a similar value setting manner, and details are not described herein again.

TABLE 4c

| Random access preamble format | DELTA_PREAMBLE (dB) | | | |
|---|---|---|---|---|
| 0 | 0 dB | | | |
| 1 | −3 dB | | | |
| 2 | −6 dB | | | |
| 3 | 0 dB | | | |
| — | SCS = 15 kHz | SCS = 30 kHz | SCS = 60 kHz | SCS = 120 kHz |
| A0, A1, A2, A3, B1, B2, B3, B4, C0, C2 | 11 dB | 14 dB | 17 dB | 20 dB |

Further, values of DELTA_PREAMBLE corresponding to different preamble formats is related to at least one of the following: a carrier frequency range of a random access resource, a subcarrier spacing (SCS) of a random access preamble, a time length of a random access preamble, a random access preamble length $N_u$, random access resource bandwidth, an initial uplink access bandwidth part (IAU BWP), uplink bandwidth, and a quantity of OFDM symbols occupied by a random access preamble.

For example, DELTA_PREAMBLE is related to the carrier frequency range of the random access resource. For example, when a carrier frequency at which the random access resource is located is less than C1 GHz, X=8. For another example, when the carrier frequency is greater than C1 GHz, X=14. for example, C1=6 GHz.

For example, in another implementation, the terminal device pre-stores a correspondence between Random access preamble format and DELTA_PREAMBLE as shown in table 5. the terminal device obtains DELTA_PREAMBLE based on Table 5, and then calculates the transmission power based on any one of the foregoing formula 1 to formula 8. DELTA_PREAMBLE corresponding to the random access preamble format is as follows:

TABLE 5

| Random access preamble format | DELTA_PREAMBLE (dB) |
|---|---|
| 0 | 0 dB |
| 1 | −3 dB |
| 2 | −6 dB |
| 3 | 0 dB |
| A0 | 0 dB |
| A1 | −3 dB |
| A2 | −6 dB |

TABLE 5-continued

| Random access preamble format | DELTA_PREAMBLE (dB) |
|---|---|
| A3 | −8 dB |
| B1 | −3 dB |
| B2 | −6 dB |
| B3 | −8 dB |
| B4 | −11 dB |
| C0 | +0 dB |
| C2 | −6 dB |

For another example, in another implementation, the terminal device pre-stores a correspondence between Random access preamble format and DELTA_PREAMBLE as shown in table 6. the terminal device obtains DELTA_PREAMBLE based on Table 6, and then calculates the transmission power based on any one of the foregoing formula 1 to formula 8. DELTA_PREAMBLE corresponding to the random access preamble format is as follows:

TABLE 6

| Random access preamble format | DELTA_PREAMBLE (dB) |
|---|---|
| 0 | 0 dB |
| 1 | −3 dB |
| 2 | −6 dB |
| 3 | 0 dB |
| A0 | 8 dB |
| A1 | 5 dB |
| A2 | 2 dB |
| A3 | 0 dB |
| B1 | 5 dB |
| B2 | 2 dB |
| B3 | 0 dB |
| B4 | −3 dB |
| C0 | 8 dB |
| C2 | 2 dB |

For another example, in another implementation, the terminal device pre-stores a correspondence between Random access preamble format and DELTA_PREAMBLE as shown in table 7. the terminal device obtains DELTA_PREAMBLE based on Table 7, and then calculates the transmission power based on any one of the foregoing formula 1 to formula 8. DELTA_PREAMBLE corresponding to the random access preamble format is as follows:

TABLE 7

| Random access preamble format | DELTA_PREAMBLE (dB) |
|---|---|
| 0 | 0 dB |
| 1 | −3 dB |
| 2 | −6 dB |
| 3 | 0 dB |
| A0 | 19 dB |
| A1 | 16 dB |
| A2 | 13 dB |
| A3 | 11 dB |
| B1 | 16 dB |
| B2 | 13 dB |
| B3 | 11 dB |
| B4 | 8 dB |
| C0 | 19 dB |
| C2 | 13 dB |

Certainly, the preamble formats 0 to 3 may be values related to X, and are not limited to the foregoing examples.

It should be understood that different offsets reflect differences between random access preamble formats, such as a time length, a sequence length, a subcarrier spacing, and a quantity of repetition times of a preamble symbol in a random access preamble format.

Alternatively, it should be understood that different offsets reflect a difference between methods used by the terminal to send or used by the base station to receive the random access preamble format: for example, a beam parameter used to receive the random access preamble when the base station receives the random access preamble format, for another example, a beam parameter used when the base station sends a downlink signal, for another example, a beam parameter used when the terminal receives a downlink signal, and for another example, a beam parameter used when the terminal sends the random access preamble. The beam parameter is related to at least one of the following: a quantity of beams, a beam gain, a beam width, and a beam direction.

In another implementation, a correspondence between a random access preamble format and DELTA_PREAMBLE in any schematic diagram in Table 5 to Table 7 may be alternatively a correspondence between a random access preamble format and a value of DELTA_PREAMBLE. The correspondence may be pre-stored on the network device and the terminal device. When receiving a random access preamble format included in a random access configuration parameter sent by the network device, the terminal device may find a corresponding value of DELTA_PREAMBLE based on the correspondence. The preset value X may be not defined herein.

The above describes that DELTA_PREAMBLE is configured in a form of a table.

DELTA_PREAMBLE may be calculated based on a formula in addition to a table.

For example, DELTA_PREAMBLE is related to a quantity $N_{OS}$ of OFDM symbols occupied (or repeated) by the random access preamble. For example, DELTA_PREAMBLE is equal to round($-10 \times \log_{10} N_{OS}$).

For another example, DELTA_PREAMBLE is related to a random access preamble length $N_u$. For example, DELTA_PREAMBLE is equal to round($-10 \times \log_{10}(N_u/N_{Ref})$), where $N_{Ref}$ is a reference length, for example, $N_{Ref}$=24576к.

For another example, DELTA_PREAMBLE is related to a subcarrier spacing SCS (or an index u corresponding to the subcarrier spacing) of the random access preamble. For example, DELTA_PREAMBLE is equal to round($-10 \times \log_{10}(SCS_{Ref}/SCS)$), where $SCS_{Ref}$ is a reference subcarrier spacing, for example, $SCS_{Ref}$=1.25 kHz, or for another example, $SCS_{Ref}$=15 kHz.

For another example, DELTA_PREAMBLE is related to a subcarrier spacing SCS (or an index u corresponding to the subcarrier spacing) of the random access preamble and a quantity $N_{OS}$ of OFDM symbols occupied (or repeated) by the random access preamble. For example, DELTA_PREAMBLE is equal to round($-10 \times \log_{10}(N_{OS} \times SCS_{Ref}/SCS)$), where round means round off.

It should be noted that, when the offset DELTA_PREAMBLE is related to parameter(s), another function may be used, for example, floor, round off, or ceiling. For another example, (being not limited to that) the foregoing implementations do not include an approximation operation. This is not limited in practice.

For another example, a correspondence between random access preamble format and DELTA_PREAMBLE values shows in Table 8, DELTA_PREAMBLE is related to a subcarrier spacing. The subcarrier spacing may be at least one of the following: a subcarrier spacing of a random access preamble, a subcarrier spacing of an uplink bandwidth part, a subcarrier spacing of a random access message 3, a subcarrier spacing of a downlink signal, and a subcarrier spacing of a downlink access bandwidth part.

TABLE 8

| Random access preamble format | DELTA_PREAMBLE values | | | |
|---|---|---|---|---|
| 0 | 0 dB | | | |
| 1 | −3 dB | | | |
| 2 | −6 dB | | | |
| 3 | 0 dB | | | |
| — | SCS = 15 kHz | SCS = 30 kHz | SCS = 60 kHz | SCS = 120 kHz |
| A0 | 11 dB | 14 dB | 17 dB | 20 dB |
| A1 | 8 dB | 11 dB | 14 dB | 17 dB |
| A2 | 5 dB | 8 dB | 11 dB | 14 dB |
| A3 | 3 dB | 6 dB | 9 dB | 12 dB |
| B1 | 8 dB | 11 dB | 14 dB | 17 dB |
| B2 | 5 dB | 8 dB | 11 dB | 14 dB |
| B3 | 3 dB | 6 dB | 9 dB | 12 dB |
| B4 | 0 dB | 3 dB | 6 dB | 9 dB |
| C0 | 11 dB | 14 dB | 17 dB | 20 dB |
| C2 | 5 dB | 8 dB | 11 dB | 14 dB |

It should be noted that, in the foregoing examples, DELTA_PREAMBLE corresponding to the random access formats A0 to C2 is related to the subcarrier spacing, and DELTA_PREAMBLE corresponding to the random access formats 0 to 3 may be unrelated to the subcarrier spacing.

After the terminal device determines DELTA_PREAMBLE and receives the preamble initial received target power and the power ramping step, the terminal device determines the transmission power of the random access preamble.

According to the communication method provided in this embodiment of this application, offsets corresponding to a plurality of random access preamble formats in a next-generation mobile communications system are provided, so that the transmission power of the random access preamble can be properly determined.

Figure 3:
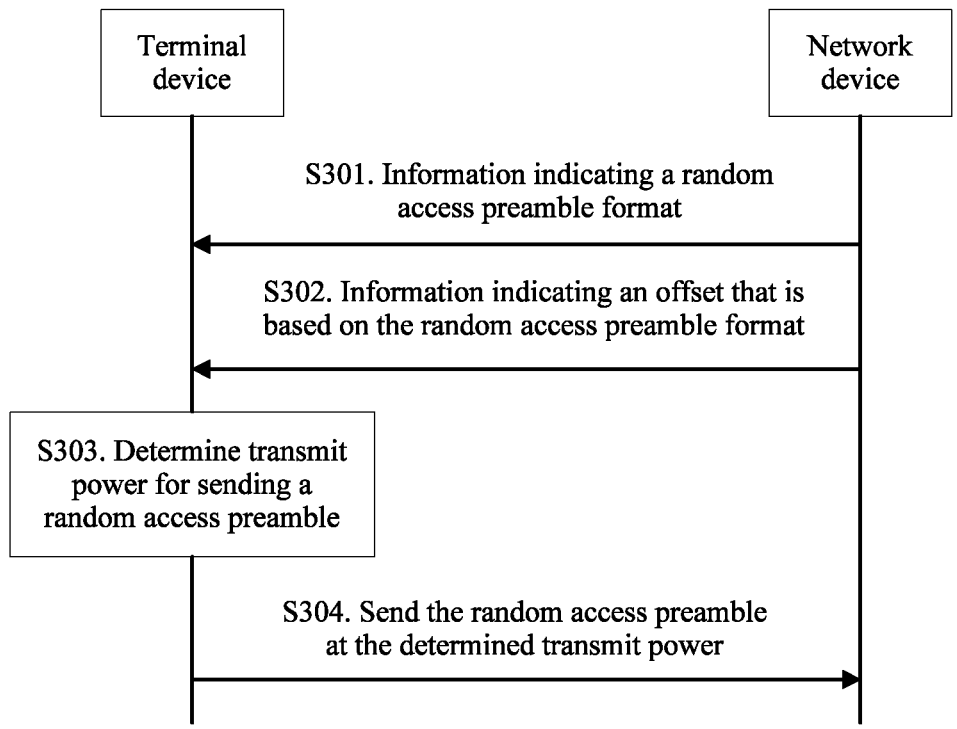
FIG. 3 is a schematic diagram of an interaction procedure of another communication method according to an embodiment of this application.

FIG. 3 is a schematic diagram of an interaction procedure of another communication method according to an embodiment of this application. The method may include the following steps:

S301: A network device sends, to a terminal device, information indicating a random access preamble format, and the terminal device receives the information indicating the random access preamble format.

S302: The network device sends, to the terminal device, information indicating an offset based on the random access preamble format, and the terminal device receives, from the network device, the information used to indicate the offset based on the random access preamble format.

S303: The terminal device determines transmission power for sending a random access preamble, where the transmission power is related to the information indicating the random access preamble format and the information indicating the offset based on the random access preamble format.

S304: The terminal device sends the random access preamble at the determined transmission power, and the network device receives the random access preamble sent by the terminal device at the determined transmission power.

Different from the embodiment shown in FIG. 2, in this embodiment, the network device further needs to send, to the terminal device, the information indicating the offset based on the random access preamble format, in other words, the terminal device determines the offset based on a configuration value of the network device.

That the terminal device determines transmission power for sending a random access preamble in S303 includes:

determining that the transmission power is a smaller value in the following two values: maximum transmission power $P_{CMAX,c}(i)$ allowed by the terminal device, and a sum of random access preamble target received power and a path loss $PL_c$ that is estimated by the terminal device; or determining that the transmission power is a smaller value in the following two values: maximum transmission power allowed by the terminal device, and a sum of random access preamble target received power, a subcarrier spacing power offset, $PL_c$, and a value of at least one parameter in the following parameters, where the at least one parameter includes: the subcarrier spacing power offset f(SCS), a random access preamble sequence offset h(L), and a beam-related offset G of the network device and/or the terminal device, where the random access preamble target received power is a sum of the following three parameters: random access preamble initial received target power, the offset based on the random access preamble format, and a product of a quantity of power ramping times minus 1 and a power ramping step.

For specific formula calculation, refer to the formulas (1) to (8) in the foregoing embodiment. Details are not described herein again.

For example, the information used to indicate the offset based on the random access preamble format includes an index number of the offset based on the random access preamble format or a value of the offset based on the random access preamble format. Details are provided below.

In an implementation, the information used to indicate the offset based on the random access preamble format includes the index number of the offset based on the random access preamble format. Offsets that are based on random access preamble formats 0 to 3 may be fixed values. For the values, refer to the offsets that are based on the random access preamble formats 0 to 3 in the foregoing embodiment. Offsets that are based on random access preamble formats A0 to C2 are determined based on index numbers of configured offsets. Table 9 shows a correspondence between DELTA_PREAMBLE_INDEX and DELTA_PREAMBLE, offsets corresponding to N index numbers are configured.

TABLE 9

| DELTA_PREAMBLE_INDEX | DELTA_PREAMBLE(dB) |
|---|---|
| 0 | Y(0) dB |
| 1 | Y(1) dB |
| 2 | Y(2) dB |
| ... | ... |
| N − 1 | Y(N − 1) dB |

An offset corresponding to the index number 0 is Y(0) dB, an offset corresponding to the index number 1 is Y(1) dB, an offset corresponding to the index number 2 is Y(2) dB, and the like. The network device and the terminal device pre-store a correspondence between an index number of an offset and the offset shown in Table 9. The network device may send any index number to the terminal device, and the terminal device finds a corresponding offset based on the index number. In Table 9, N, Y(0), Y(1), . . . , and Y(N−1) are preset values, for example, N=1 to 128, and a value range of Y(0), Y(1), . . . , and Y(N−1) is −100 to 100. It should be understood that, offsets corresponding to indexes of different offsets in Table 9 are related to at least one of the following parameters: a carrier frequency range of a random access resource, a subcarrier spacing of a random access preamble, a time length of a random access preamble, a random access preamble length $N_u$, a quantity of OFDM symbols occupied by a random access preamble, a quantity $N_b$ of base station receive beams in a random access preamble format, and a terminal transmit beam and/or a base station receive beam of a random access preamble.

For example, DELTA_PREAMBLE is related to the quantity $N_{OS}$ of OFDM symbols occupied by the random access preamble. For example, DELTA_PREAMBLE is equal to round($-10\times\log_{10} N_{OS}$).

For another example, DELTA_PREAMBLE is related to the random access preamble length $N_u$. For example, DELTA_PREAMBLE is equal to round($-10\times\log_{10}(N_u/N_{Ref})$), where $N_{Ref}$ is a reference length, for example, $N_{Ref}$=24576к.

For another example, the offset DELTA_PREAMBLE is related to the quantity $N_b$ of base station receive beams in the random access preamble format. For example, DELTA_PREAMBLE is equal to round($-10\times\log_{10} N_b$).

For another example, DELTA_PREAMBLE is related to the subcarrier spacing SCS (or an index u corresponding to the subcarrier spacing) of the random access preamble and the quantity $N_{OS}$ of OFDM symbols occupied (or repeated) by the random access preamble. For example, DELTA_PREAMBLE is equal to round($-10\times\log_{10}(N_{OS}\times SCS_{Ref}/SCS)$).

For another example, DELTA_PREAMBLE is related to the quantity $N_b$ of base station receive beams and the quantity $N_{OS}$ of OFDM symbols occupied (or repeated) by the random access preamble. For example, DELTA_PREAMBLE is equal to round($-10\times\log_{10}(N_{OS}\times N_b)$).

For another example, DELTA_PREAMBLE is related to the subcarrier spacing SCS (or an index u corresponding to the subcarrier spacing) of the random access preamble and the quantity $N_b$ of base station receive beams. For example, DELTA_PREAMBLE is equal to round($-10\times\log_{10}(N_b\times SCS_{Ref}/SCS)$).

For another example, DELTA_PREAMBLE is related to the subcarrier spacing SCS (or an index u corresponding to the subcarrier spacing) of the random access preamble, the quantity $N_{OS}$ of OFDM symbols occupied (or repeated) by the random access preamble, and the quantity $N_b$ of base station receive beams. For example, DELTA_PREAMBLE is equal to round($-10\times\log_{10}(N_{OS}\times N_b\times SCS_{Ref}/SCS)$), where round means round off.

It should be noted that, when the offset DELTA_PREAMBLE is related to parameter(s), another function may be used, for example, floor, round off, or ceiling. For another example, (being not limited to that) the foregoing implementations do not include an approximation operation. This is not limited in practice.

Distribution of offsets is described below by using an example.

In an example, values of the offset based on the random access preamble format include N elements, values of the N elements are distributed in equal difference, and N is a positive integer. Using this offset is simple and feasible. For example, Y(i)=Y(i−1)+D, where a difference value D may be any constant, and Y(0) or Y(N−1) may be any constant.

For example, Table 10 shows a correspondence between DELTA_PREAMBLE_INDEX and DELTA_PREAMBLE, Y(0)=0, and D=−2.

TABLE 10

| DELTA_PREAMBLE_INDEX | DELTA_PREAMBLE(dB) |
|---|---|
| 0 | 0 dB |
| 1 | −2 dB |
| 2 | −4 dB |
| 3 | −6 dB |
| 4 | −8 dB |
| 5 | −10 dB |
| 6 | −12 dB |
| 7 | −14 dB |

In Table 10, values of the offset based on the random access preamble format that correspond to the index numbers 0 to 7 are respectively: {0 dB, −2 dB, −4 dB, −6 dB, −8 dB, −10 dB, −12 dB, −14 dB}.

For example, Table 11 shows a correspondence between DELTA_PREAMBLE_INDEX and DELTA_PREAMBLE, Y(0)=8, and D=−2.

TABLE 11

| DELTA_PREAMBLE_INDEX | DELTA_PREAMBLE(dB) |
|---|---|
| 0 | 8 dB |
| 1 | 6 dB |
| 2 | 4 dB |
| 3 | 2 dB |

TABLE 11-continued

| DELTA_PREAMBLE_INDEX | DELTA_PREAMBLE(dB) |
|---|---|
| 4 | 0 dB |
| 5 | −2 dB |
| 6 | −4 dB |
| 7 | −6 dB |

In Table 11, values of the offset based on the random access preamble format that correspond to the index numbers 0 to 7 are respectively: {8 dB, 6 dB, 4 dB, 2 dB, 0 dB, −2 dB, −4 dB, −6 dB}.

For example, Table 12 shows a correspondence between DELTA_PREAMBLE_INDEX and DELTA_PREAMBLE, Y(0)=19, and D=−2.

TABLE 12

| DELTA_PREAMBLE_INDEX | DELTA_PREAMBLE(dB) |
|---|---|
| 0 | 19 dB |
| 1 | 17 dB |
| 2 | 15 dB |
| 3 | 13 dB |
| 4 | 11 dB |
| 5 | 9 dB |
| 6 | 7 dB |
| 7 | 5 dB |

In Table 12, values of the offset based on the random access preamble format that correspond to the index numbers 0 to 7 are respectively: {19 dB, 17 dB, 15 dB, 13 dB, 11 dB, 9 dB, 7 dB, 5 dB}.

The foregoing shows a correspondence that is between DELTA_PREAMBLE_INDEX and DELTA_PREAMBLE and that is represented in a form of a table. In practice, the correspondence may be alternatively presented in another manner. For example, in a system message or an RRC message, any one of the following manners may be used.

```
DeltaPreamblePowerOffset  ENUMERATED {
dB Y(0), dB Y(1), dB Y(2), dB Y(3), ..., dB Y(N−1), spare, ...}   OPTIONAL
or when N = 8,
DeltaPreamblePowerOffset  ENUMERATED {
dB −4, dB −12, dB −10, dB −8, dB −6, dB −4, dB −2, dB 0}   OPTIONAL
or when N = 8,
DeltaPreamblePowerOffset  ENUMERATED {
dB −6, dB −4, dB −2, dB 0, dB 2, dB 4, dB 6, dB 8}   OPTIONAL
or when N = 8,
DeltaPreamblePowerOffset  ENUMERATED {
dB 5, dB 7, dB 9, dB 11, dB 13, dB 15, dB 17, dB 19}   OPTIONAL
or when N = 8,
DeltaPreamblePowerOffset  ENUMERATED {
dB −3, dB −1, dB 1, dB 3, dB 5, dB 7, dB 9, dB 11}   OPTIONAL
or when N = 8,
DeltaPreamblePowerOffset  ENUMERATED {
dB 0, dB 2, dB 4, dB 6, dB 8, dB 10, dB 12, dB 14}   OPTIONAL
or when N = 8,
DeltaPreamblePowerOffset  ENUMERATED {
dB 6, dB 8, dB 10, dB 12, dB 14, dB 16, dB 18, dB 20}   OPTIONAL
or when N = 8,
DeltaPreamblePowerOffset  ENUMERATED {
dB −14, dB −11, dB −8, dB −6, dB −4.5, dB −3, dB 0}   OPTIONAL
or when N = 8,
DeltaPreamblePowerOffset  ENUMERATED {
dB −6, dB −3, dB 0, dB 2, dB 3.5, dB 5, dB 8}   OPTIONAL
or when N = 8,
DeltaPreamblePowerOffset  ENUMERATED {
dB 5, dB 8, dB 11, dB 13, dB 14.5, dB 16, dB 19}   OPTIONAL
or when N = 8,
DeltaPreamblePowerOffset  ENUMERATED {
dB −6, dB −8, dB −10, dB −12, dB −14, dB −16, dB −18, dB −20}   OPTIONAL
```

Further, Y(0), . . . , Y(N−1), N, and D are related to a subcarrier spacing. The subcarrier spacing may be at least one of the following: a subcarrier spacing of a random access preamble, a subcarrier spacing of an uplink bandwidth part, a subcarrier spacing of a random access message 3, a subcarrier spacing of a downlink signal, and a subcarrier spacing of a downlink access bandwidth part.

For example, Table 13 shows a correspondence between DELTA_PREAMBLE_INDEX and DELTA_PREAMBLE values in four SCS:

TABLE 13

| DELTA_PREAMBLE_INDEX | DELTA_PREAMBLE values | | | |
|---|---|---|---|---|
| | SCS = 15 kHz | SCS = 30 kHz | SCS = 60 kHz | SCS = 120 kHz |
| 0 | 11 dB | 14 dB | 17 dB | 20 dB |
| 1 | 9 dB | 12 dB | 15 dB | 18 dB |
| 2 | 7 dB | 10 dB | 13 dB | 16 dB |
| 3 | 5 dB | 8 dB | 11 dB | 14 dB |
| 4 | 3 dB | 6 dB | 9 dB | 12 dB |
| 5 | 1 dB | 4 dB | 7 dB | 10 dB |
| 6 | −1 dB | 2 dB | 5 dB | 8 dB |
| 7 | −3 dB | 0 dB | 3 dB | 6 dB |

In Table 13, D=−2, and when the subcarrier spacing is 15 kHz, Y(0)=11, and offsets corresponding to the index numbers 0 to 7 are respectively {11 dB, 9 dB, 7 dB, 5 dB, 3 dB, 1 dB, −1 dB, −3 dB}. When the subcarrier spacing is 30 kHz, Y(0)=14, and offsets corresponding to the index numbers 0 to 7 are respectively {14 dB, 12 dB, 10 dB, 8 dB, 6 dB, 4 dB, 2 dB, 0 dB}. For another example, when the subcarrier spacing is 60 kHz, Y(0)=17, and offsets corresponding to the index numbers 0 to 7 are respectively {17 dB, 15 dB, 13 dB, 11 dB, 9 dB, 7 dB, 5 dB, 3 dB}. For another example, when the subcarrier spacing is 120 kHz, Y(0)=20, and offsets corresponding to the index numbers 0 to 7 are respectively {20 dB, 18 dB, 16 dB, 14 dB, 12 dB, 10 dB, 8 dB, 6 dB}.

In an example, values of the offset based on the random access preamble format include M elements, values of the M elements are distributed in ascending or descending order, and M is a positive integer. In other words, $Y(i)=Y(i-1)+D(i)$ or $Y(i)=Y(0)+E(i)$, where $D(i)$ and $E(i)$ may be any constant, and $D(i)$ and $E(i)$ may be the same or different, where i=1, 2, . . . , N−1. Y(0) or Y(N−1) may be any constant, for example, Table 14 shows a correspondence between DELTA_PREAMBLE_INDEX and DELTA_PREAMBLE.

TABLE 14

| DELTA_PREAMBLE_INDEX | DELTA_PREAMBLE(dB) |
|---|---|
| 0 | Y(0) − 0 dB |
| 1 | Y(0) − 3 dB |
| 2 | Y(0) − 4.5 dB |
| 3 | Y(0) − 6 dB |
| 4 | Y(0) − 8 dB |
| 5 | Y(0) − 11 dB |
| 6 | Y(0) − 14 dB |
| Reserved | Reserved |

In Table 14, $Y(i)=Y(0)+E(i)$ is used for representation, and E(i) corresponding to the index numbers 0 to 6 is respectively 0, −3, −4.5, −6, −8, −11, and −14.

For example, if the expression in Table 14 is used, and Y(0)=0, Table 15 is obtained, Table 15 shows a correspondence between DELTA_PREAMBLE_INDEX and DELTA_PREAMBLE.

TABLE 15

| DELTA_PREAMBLE_INDEX | DELTA_PREAMBLE(dB) |
|---|---|
| 0 | −0 dB |
| 1 | −3 dB |
| 2 | −4.5 dB |
| 3 | −6 dB |
| 4 | −8 dB |
| 5 | −11 dB |

TABLE 15-continued

| DELTA_PREAMBLE_INDEX | DELTA_PREAMBLE(dB) |
|---|---|
| 6 | −14 dB |
| Reserved | Reserved |

In Table 15, values of the offset based on the random access preamble format that correspond to the index numbers 0 to 6 are respectively: {0 dB, −3 dB, −4.5 dB, −6 dB, −8 dB, −11 dB, −14 dB}.

If the expression in Table 14 is used, and Y(0)=0, Table 16 is obtained, Table 16 shows a correspondence between DELTA_PREAMBLE_INDEX and DELTA_PREAMBLE.

TABLE 16

| DELTA_PREAMBLE_INDEX | DELTA_PREAMBLE(dB) |
|---|---|
| 0 | 8 dB |
| 1 | 5 dB |
| 2 | 3.5 dB |
| 3 | 2 dB |
| 4 | 0 dB |
| 5 | −3 dB |
| 6 | −6 dB |
| Reserved | Reserved |

In Table 16, values of the offset based on the random access preamble format that correspond to the index numbers 0 to 6 are respectively: {8 dB, 5 dB, 3.5 dB, 2 dB, 0 dB, −3 dB, −6 dB}.

If the expression in Table 14 is used, and Y(0)=0, Table 17 is obtained, Table 17 shows a correspondence between DELTA_PREAMBLE_INDEX and DELTA_PREAMBLE.

TABLE 17

| DELTA_PREAMBLE_INDEX | DELTA_PREAMBLE(dB) |
|---|---|
| 0 | 19 dB |
| 1 | 16 dB |
| 2 | 14.5 dB |
| 3 | 13 dB |
| 4 | 11 dB |
| 5 | 8 dB |
| 6 | 5 dB |
| Reserved | Reserved |

In Table 17, values of the offset based on the random access preamble format that correspond to the index numbers 0 to 6 are respectively: {19 dB, 16 dB, 14.5 dB, 13 dB, 11 dB, 8 dB, 5 dB}. It should be noted that, this is not limited in practice, and the foregoing is merely examples.

Further, at least one of Y(0), . . . , Y(N−1), D, D(1), . . . , D(N−1), E(1), . . . , and E(N−1) is related to a carrier frequency range and/or a subcarrier spacing. For example, the at least one of Y(0), . . . , Y(N−1), D, D(1), . . . , D(N−1), E(1), . . . , and E(N−1) is related to a carrier frequency, and when a carrier frequency at which a random access resource is located is less than C1 GHz, Y(0)=8. For another example, when the carrier frequency at which the random access resource is located is greater than C1 GHz, Y(0)=14. for example, C1=6 GHz. It should be understood that Y(1), . . . , Y(N−1), D, D(1), . . . , D(N−1), E(1), . . . , and E(N−1) may also have a similar value setting manner, and details are not described herein again.

In another implementation, at least one of Y(0), . . . , Y(N−1), D, D(1), . . . , D(N−1), E(1), . . . , and E(N−1) is related to a subcarrier spacing. The subcarrier spacing may be at least one of the following: a subcarrier spacing of a random access preamble, a subcarrier spacing of an uplink bandwidth part, a subcarrier spacing of a random access message 3, a subcarrier spacing of a downlink signal, and a subcarrier spacing of a downlink access bandwidth part. Table 18 shows a correspondence between DELTA_PREAMBLE_INDEX and DELTA_PREAMBLE values:

TABLE 18

| | DELTA_PREAMBLE values | | | |
|---|---|---|---|---|
| DELTA_PREAMBLE_INDEX | SCS = 15 kHz | SCS = 30 kHz | SCS = 60 kHz | SCS = 120 kHz |
| 0 | 11 dB | 14 dB | 17 dB | 20 dB |
| 1 | 8 dB | 11 dB | 14 dB | 17 dB |
| 2 | 6.5 dB | 9.5 dB | 12.5 dB | 15.5 dB |
| 3 | 5 dB | 8 dB | 11 dB | 14 dB |
| 4 | 3 dB | 6 dB | 9 dB | 12 dB |
| 5 | 0 dB | 3 dB | 6 dB | 9 dB |
| 6 | −3 dB | 0 dB | 3 dB | 6 dB |
| Reserved | — | — | — | — |

In Table 18, when the subcarrier spacing is 15 kHz, Y(0)=11. For another example, when the subcarrier spacing is 30 kHz, Y(0)=14. For another example, when the subcarrier spacing is 60 kHz, Y(0)=17. For another example, when the subcarrier spacing is 120 kHz, Y(0)=20.

The foregoing shows a correspondence that is between DELTA_PREAMBLE_INDEX and DELTA_PREAMBLE and that is represented in a form of a table. In another implementation, any one of the following manners may be used.

When the subcarrier spacing is 15 kHz and N=8,

```
DeltaPreamblePowerOffset  ENUMERATED {
dB -3, dB 0, dB 3, dB 5, dB 6.5, dB 8, dB 11}   OPTIONAL
When the subcarrier spacing is 30 kHz and N = 8,
DeltaPreamblePowerOffset  ENUMERATED {
dB 0, dB 3, dB 6, dB 8, dB 9.5, dB 11, dB 14}   OPTIONAL
When the subcarrier spacing is 60 kHz and N = 8,
DeltaPreamblePowerOffset  ENUMERATED {
dB 3, dB 6, dB 9, dB 11, dB 12.5, dB 14, dB 17}         OPTIONAL
When the subcarrier spacing is 120 kHz and N = 8,
DeltaPreamblePowerOffset  ENUMERATED {
dB 6, dB 9, dB 12, dB 14, dB 15.5, dB 17, dB            OPTIONAL
20}
```

It should be understood that at least one of the foregoing different Y(0), Y(1), ..., Y(N−1), N, D, D(1), D(2), ..., D(N−1), E(1), E(2), ..., and E(N−1) may directly or implicitly reflect/indicate at least one of the following: a subcarrier spacing of a random access preamble, a random access preamble sequence length, a corresponding beam gain obtained when the network device receives a random access preamble, a quantity of beams used when the network device receives a random access preamble, a difference between a beam gain obtained when the network device sends a downlink signal and a beam gain obtained when the network device receives a random access preamble, a carrier frequency range, and a quantity of receive beams of the network device within a time length of a random access preamble. In a time length of one random access preamble, the network device receives a same random access preamble by using N receive beams, to obtain a higher processing gain or obtain a receive beam that is more suitable for the terminal device. It should be understood that N may be greater than/equal to/less than a quantity of preamble sequences in one random access preamble or a quantity of repetition times of a preamble sequence. When N may be greater than the quantity of preamble sequences in one random access preamble or the quantity of repetition times of a preamble sequence, the network device may use a beam in a digital domain, to be specific, in a same antenna transceiver unit, use a plurality of groups of digital domain beam coefficients to form a plurality of receive beams.

In another implementation, the information used to indicate the offset based on the random access preamble format includes a value of the offset based on the random access preamble format. For example, the offsets in Table 9 may be represented as {Y(0), Y(1), Y(2), ..., Y(N−1)}, and a rank of an offset in the set represents an index of the offset. The network device sends the set of the offsets to the terminal device. The terminal device selects, by default, a specific offset in the set as an offset used for calculating transmission power of the terminal device. Similarly, a form of an offset set may also be used for Table 10 to Table 17.

In this application, different implementation methods may be performed in combination. A specific implementation is not described herein.

In this application, ranks of rows in the table may be randomly exchanged/replaced/changed.

According to the communication method provided in this embodiment of this application, offsets corresponding to a plurality of random access preamble formats in a next-generation mobile communications system are provided. The information indicating the offset based on the random access preamble format includes the index number of the offset based on the random access preamble format or the value of the offset based on the random access preamble format. In this way, the transmission power of the random access preamble can be properly determined based on the offset.

The methods in the embodiments of this application are described in detail above, and an apparatus in an embodiment of this application is provided below.

Figure 4:
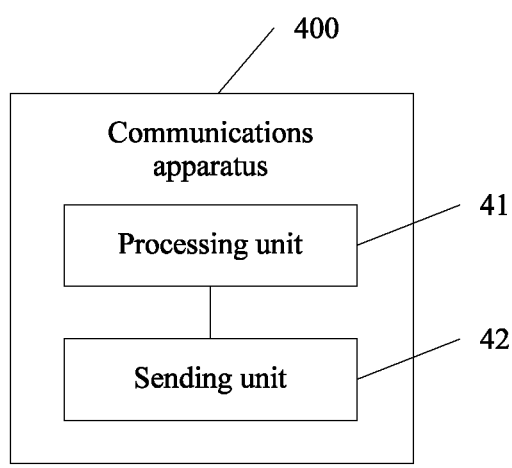
FIG. 4 is a schematic structural diagram of a communications apparatus according to an embodiment of this application.

Based on a same concept as the communication methods in the foregoing embodiments, as shown in FIG. 4, an embodiment of this application further provides a communications apparatus, and the communications apparatus may be applied to the foregoing communication methods. The communications apparatus 400 includes a processing unit 41 and a sending unit 42.

The processing unit 41 is configured to determine transmission power for sending a random access preamble, where the transmission power is related to a random access preamble format and an offset DELTA_PREAMBLE that is based on the random access preamble format.

The sending unit 42 is configured to send the random access preamble at the transmission power determined by the processing unit.

In an implementation, the processing unit 41 is configured to:

determine that the transmission power is a smaller value in the following two values: maximum transmission power $P_{CMAX,c}(i)$ allowed by a terminal device, and a sum of random access preamble target received power and a path loss $PL_c$ that is estimated by the terminal device; or determine that the transmission power is a smaller value in the following two values: maximum transmission power allowed by a terminal device, and a sum of random access preamble target received power, a subcarrier spacing power offset, $PL_c$, and a value of at least one parameter in the following parameters, where the at least one parameter includes: the subcarrier spacing power offset f(SCS), a random access preamble sequence offset h(L), and a beam-related offset G of a network device and/or the terminal device, where the random access preamble target received power is a sum of the following three parameters: random access preamble initial received target power, the offset DELTA_PREAMBLE based on the random access preamble format, and a product of a quantity of power ramping times minus 1 and a power ramping step.

In another implementation, for a random access preamble format 2, an offset DELTA_PREAMBLE based on the random access preamble format 2 is −6 decibels dB; and/or for a random access preamble is format 3, an offset DELTA_PREAMBLE based on the random access preamble format 3 is 0 dB.

In still another implementation, for a random access preamble format A1, an offset based on the random access preamble format A1 is X−3 dB; or for a random access preamble format A2, an offset based on the random access preamble format A2 is X−6 dB; or for a random access preamble format A3, an offset based on the random access preamble format A3 is X−8 dB; or for a random access preamble format B1, an offset based on the random access preamble format B1 is X−3 dB; or for a random access preamble format B2, an offset based on the random access preamble format B2 is X−6 dB; or for a random access preamble format B3, an offset based on the random access preamble format B3 is X−8 dB; or for a random access preamble format B4, an offset based on the random access preamble format B4 is X−11 dB; or for a random access preamble format C0, an offset based on the random access preamble format C0 is X+0 dB; or for a random access preamble format C2, an offset based on the random access preamble format C2 is X−6 dB, where X is an integer or a decimal.

In still another implementation, when a subcarrier spacing is a first value, and for a random access preamble format A1, an offset based on the random access preamble format A1 is 8 dB; or for a random access preamble format A2, an offset based on the random access preamble format A2 is 5 dB; or for a random access preamble format A3, an offset based on the random access preamble format A3 is 3 dB; or for a random access preamble format B1, an offset based on the random access preamble format B1 is 8 dB; or for a random access preamble format B2, an offset based on the random access preamble format B2 is 5 dB; or for a random access preamble format B3, an offset based on the random access preamble format B3 is 3 dB; or for a random access preamble format B4, an offset based on the random access preamble format B4 is 0 dB; or for a random access preamble format C0, an offset based on the random access preamble format C0 is 11 dB; or for a random access preamble format C2, an offset based on the random access preamble format C2 is 5 dB.

In still another implementation, when a subcarrier spacing is a second value, and for a random access preamble format A1, an offset based on the random access preamble format A1 is 11 dB; or for a random access preamble format A2, an offset based on the random access preamble format A2 is 8 dB; or for a random access preamble format A3, an offset based on the random access preamble format A3 is 6 dB; or for a random access preamble format B1, an offset based on the random access preamble format B1 is 11 dB; or for a random access preamble format B2, an offset based on the random access preamble format B2 is 8 dB; or for a random access preamble format B3, an offset based on the random access preamble format B3 is 6 dB; or for a random access preamble format B4, an offset based on the random access preamble format B4 is 3 dB; or for a random access preamble format C0, an offset based on the random access preamble format C0 is 14 dB; or for a random access preamble format C2, an offset based on the random access preamble format C2 is 8 dB.

In still another implementation, when a subcarrier spacing is a third value, and a format of a random access preamble A1, an offset based on the random access preamble format A1 is 14 dB; or for a random access preamble format A2, an offset based on the random access preamble format A2 is 11 dB; or for a random access preamble format A3, an offset based on the random access preamble format A3 is 9 dB; or for a random access preamble format B1, an offset based on the random access preamble format B1 is 14 dB; or for a random access preamble format B2, an offset based on the random access preamble format B2 is 11 dB; or for a random access preamble format B3, an offset based on the random access preamble format B3 is 9 dB; or for a random access preamble format B4, an offset based on the random access preamble format B4 is 6 dB; or for a random access preamble format C0, an offset based on the random access preamble format C0 is 17 dB; or for a random access preamble format C2, an offset based on the random access preamble format C2 is 11 dB.

In still another implementation, when a subcarrier spacing is a fourth value, and when a random access preamble format is A1, an offset based on the random access preamble format A1 is 17 dB; or for a random access preamble format A2, an offset based on the random access preamble format A2 is 14 dB; or for a random access preamble format A3, an offset based on the random access preamble format A3 is 12 dB; or for a random access preamble format B1, an offset based on the random access preamble format B1 is 17 dB; or for a random access preamble format B2, an offset based on the random access preamble format B2 is 14 dB; or for a random access preamble format B3, an offset based on the random access preamble format B3 is 12 dB; or for a random access preamble format B4, an offset based on the random access preamble format B4 is 9 dB; or for a random access preamble format C0, an offset based on the random access preamble format C0 is 20 dB; or for a random access preamble format C2, an offset based on the random access preamble format C2 is 14 dB.

According to the communications apparatus provided in this embodiment of this application, offsets corresponding to a plurality of random access preamble formats in a next-generation mobile communications system are provided, so that the transmission power of the random access preamble can be properly determined.

Figure 5:
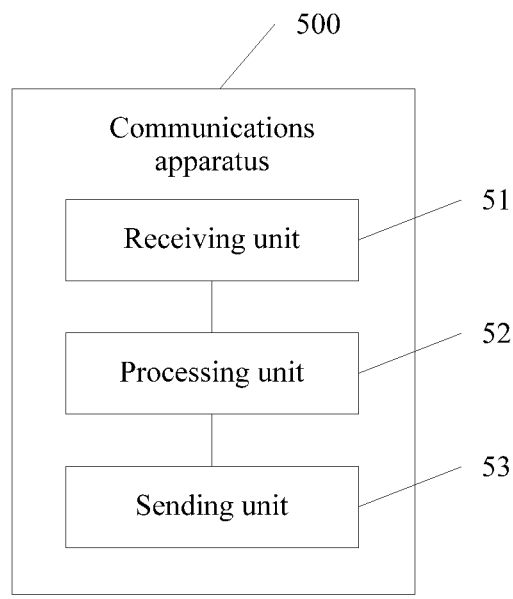
FIG. 5 is a schematic structural diagram of another communications apparatus according to an embodiment of this application.

Based on a same concept as the communication methods in the foregoing embodiments, as shown in FIG. 5, an embodiment of this application further provides a schematic structural diagram of another communications apparatus. The communications apparatus may be applied to the foregoing communication methods. The communications apparatus 500 includes a receiving unit 51, a processing unit 52, and a sending unit 53.

The receiving unit 51 is configured to receive, from a network device, information indicating a random access preamble format.

The receiving unit 51 is further configured to receive, from the network device, information used to indicate an offset DELTA_PREAMBLE that is based on the random access preamble format.

The processing unit 52 is configured to determine transmission power for sending a random access preamble, where the transmission power is related to the information indicating the random access preamble format and the information indicating the offset DELTA_PREAMBLE based on the random access preamble format.

The sending unit 53 is configured to send the random access preamble at the determined transmission power.

In an implementation, the processing unit 52 is configured to:

determine that the transmission power is a smaller value in the following two values: maximum transmission power $P_{CMAX,c}(i)$ allowed by a terminal device, and a sum of random access preamble target received power and a path loss $PL_c$ that is estimated by the terminal device; or determine that the transmission power is a smaller value in the following two values: maximum transmission power allowed by a terminal device, and a sum of random access preamble target received power, a subcarrier spacing power offset, $PL_c$, and a value of at least one parameter in the following parameters, where the at least one parameter includes: the subcarrier spacing power offset f(SCS), a random access preamble sequence offset h(L), and a beam-related offset G of the network device and/or the terminal device, where the random access preamble target received power is a sum of the following three parameters: random access preamble initial received target power, the offset based on the random access preamble format, and a product of a quantity of power ramping times minus 1 and a power ramping step.

In another implementation, the information used to indicate the offset based on the random access preamble format includes:

an index number of the offset based on the random access preamble format or a value of the offset based on the random access preamble format.

In still another implementation, values of the offset DELTA_PREAMBLE based on the random access preamble format include N elements, values of the N elements are distributed in equal difference, and N is a positive integer.

In still another implementation, values of the offset based on the random access preamble format include: {0 dB, −2 dB, −4 dB, −6 dB, −8 dB, −10 dB, −12 dB, −14 dB}, {8 dB, 6 dB, 4 dB, 2 dB, 0 dB, −2 dB, −4 dB, −6 dB}, or {19 dB, 17 dB, 15 dB, 13 dB, 11 dB, 9 dB, 7 dB, 5 dB}.

In yet another implementation, values of the offset based on the random access preamble format include M elements, values of the M elements are distributed in ascending or descending order, and M is a positive integer.

In a further implementation, values of the offset based on the random access preamble format include: {0 dB, −3 dB, −4.5 dB, −6 dB, −8 dB, −11 dB, −14 dB}, {8 dB, 5 dB, 3.5 dB, 2 dB, 0 dB, −3 dB, −6 dB}, or {19 dB, 16 dB, 14.5 dB, 13 dB, 11 dB, 8 dB, 5 dB}.

According to the communications apparatus provided in this embodiment of this application, offsets corresponding to a plurality of random access preamble formats in a next-generation mobile communications system are provided. The information indicating the offset based on the random access preamble format includes the index number of the offset based on the random access preamble format or the value of the offset based on the random access preamble format. In this way, the transmission power of the random access preamble can be properly determined based on the offset.

Figure 6:
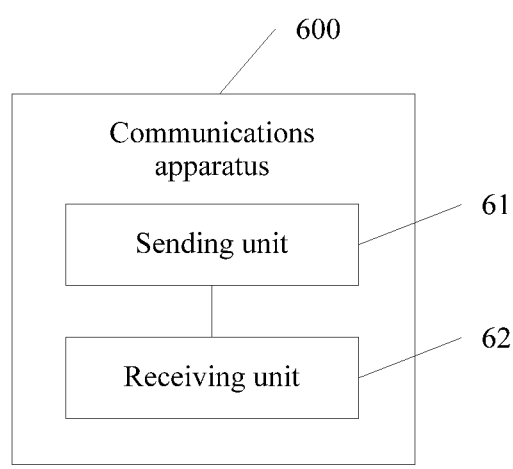
FIG. 6 is a schematic structural diagram of still another communications apparatus according to an embodiment of this application.

Based on a same concept as the communication methods in the foregoing embodiments, as shown in FIG. 6, an embodiment of this application further provides a schematic structural diagram of still another communications apparatus. The communications apparatus 600 includes a sending unit 61 and a receiving unit 62.

The sending unit 61 is configured to send, to a terminal device, information indicating a random access preamble format.

The receiving unit 62 is configured to receive a random access preamble sent by the terminal device at determined transmission power, where the transmission power is related to the random access preamble format and an offset based on the random access preamble format.

In an implementation, the sending unit is further configured to send, to the terminal device, information indicating the offset based on the random access preamble format.

According to the communications apparatus provided in this embodiment of this application, offsets corresponding to a plurality of random access preamble formats in a next-generation mobile communications system are provided, so that the transmission power of the random access preamble can be properly determined.

The communications apparatus in this application may be a terminal device, or may be a chip or an integrated circuit installed on the terminal device.

Figure 7:
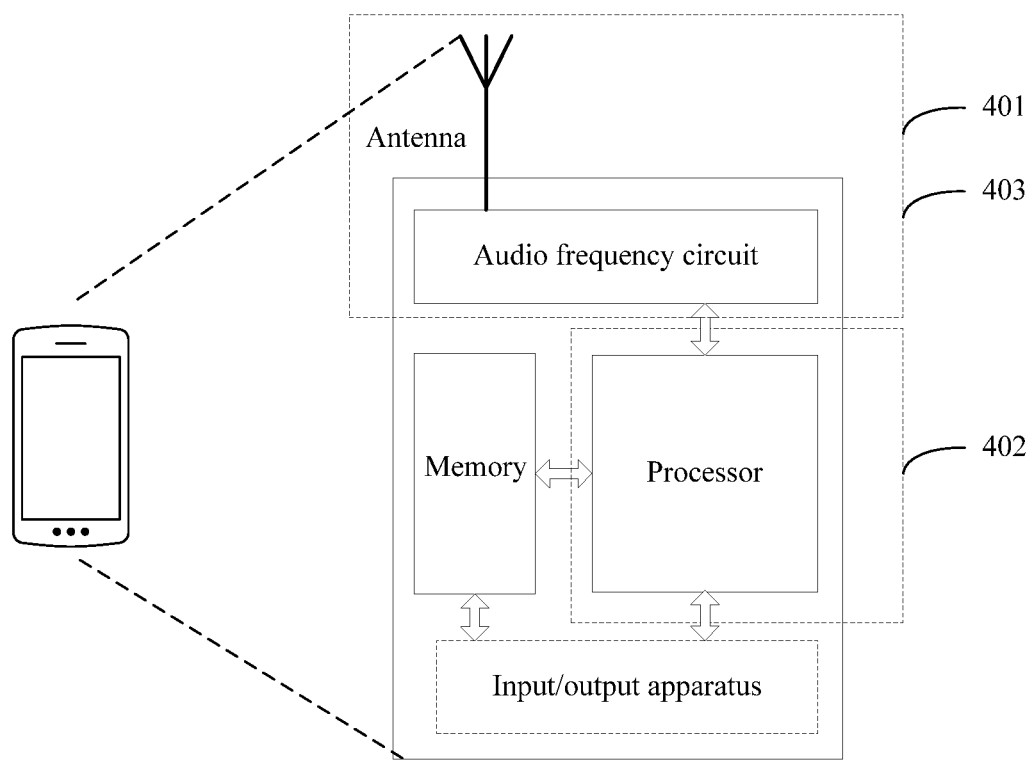
FIG. 7 is a schematic structural diagram of a simplified terminal device according to an embodiment of this application.

For example, the communications apparatus is a terminal device. FIG. 7 is a schematic structural diagram of a simplified terminal device. For ease of understanding and convenience of illustration, in FIG. 7, a mobile phone is used as an example of the terminal device. As shown in FIG. 7, the terminal device includes a processor, a memory, a radio frequency circuit, an antenna, and an input/output apparatus. The processor is mainly configured to: process a communications protocol and communication data, and control the terminal device to execute a software program, process data of the software program, and the like. The memory is mainly configured to store a software program and data. The radio frequency circuit is mainly used for conversion between a baseband signal and a radio frequency signal and processing of the radio frequency signal. The antenna is mainly configured to receive and transmit a radio frequency signal in a form of an electromagnetic wave. The input/output apparatus, such as, a touchscreen, a display, or a keyboard, is mainly configured to receive data input by a user and output data to the user. It should be noted that some types of terminal devices may not have the input/output apparatus.

When data needs to be sent, the processor performs baseband processing on the to-be-sent data, and then outputs a baseband signal to the radio frequency circuit. After performing radio frequency processing on the baseband signal, the radio frequency circuit sends the radio frequency signal in a form of an electromagnetic wave by using the antenna. When data is sent to the terminal device, the radio frequency circuit receives a radio frequency signal by using the antenna, converts the radio frequency signal into a baseband signal, and outputs the baseband signal to the processor, and the processor converts the baseband signal into data and processes the data. For ease of description, FIG. 7 shows one memory and one processor. In an actual terminal device product, there may be one or more processors and one or more memories. The memory may also be referred to as a storage medium, a storage device, or the like. The memory may be disposed independent of the processor, or may be integrated into the processor. This is not limited in this embodiment of this application.

In this embodiment of this application, the antenna and the radio frequency circuit that have a transmitting/receiving function may be considered as a sending unit and a receiving unit (or may be collectively referred to as a transceiver unit) of the terminal device, and a processor that has a processing function may be considered as the processing unit of the terminal device. As shown in FIG. 7, the terminal device includes a receiving unit 401, a processing unit 402, and a sending unit 403. The receiving unit 401 may also be referred to as a receiver, a receiving circuit, or the like, and the sending unit 403 may also be referred to as a transmitter, a transmitting circuit, or the like. The processing unit may also be referred to as a processor, a processing board, a processing module, a processing apparatus, or the like.

For example, in an embodiment, the receiving unit 401 is configured to perform step S201 in the embodiment shown in FIG. 2, the processing unit 402 is configured to perform step S202 in the embodiment shown in FIG. 2, and the sending unit 403 is configured to perform step S203 in the embodiment shown in FIG. 2.

For another example, in another embodiment, the receiving unit 401 is configured to perform step S301 and S302 in the embodiment shown in FIG. 3, the processing unit 402 is configured to perform step S303 in the embodiment shown in FIG. 3, and the sending unit 403 is configured to perform step S304 in the embodiment shown in FIG. 3.

An embodiment of this application further provides a communications apparatus, and the communications apparatus is configured to perform the foregoing communication methods. Some or all of the foregoing communication methods may be implemented by using hardware, or may be implemented by using software. When some or all of the foregoing communication methods are implemented by using hardware, the communication apparatus includes: a receiver, configured to receive information, for example, receive, from a network device, information indicating a random access preamble format, and further configured to receive, from the network device, information indicating an offset DELTA_PREAMBLE based on the random access preamble format; a processing circuit, configured to perform the foregoing communication methods, for example, determine transmission power for sending a random access preamble; and a transmitter, configured to output the random access preamble.

Optionally, the communications apparatus may be a chip or an integrated circuit in specific implementation.

Optionally, when some or all of the communication methods in the foregoing embodiments are implemented by using software, the communications apparatus includes: a memory, configured to store a program; and a processor, configured to execute the program stored in the memory. When the program is executed, the communications apparatus may implement the communication methods provided in the foregoing embodiments.

Optionally, the memory may be a physically independent unit, or may be integrated into the processor.

Optionally, when some or all of the communication methods in the foregoing embodiments are implemented by using software, the communications apparatus may alternatively include only a processor. A memory configured to store a program is located outside the communications apparatus, and the processor is connected to the memory by using a circuit/wire, and is configured to read and execute the program stored in the memory.

The processor may be a central processing unit (CPU), a network processor (NP), or a combination of a CPU and an NP.

The processor may further include a hardware chip. The hardware chip may be an application-specific integrated circuit (ASIC), a programmable logic device (PLD), or a combination thereof. The PLD may be a complex programmable logic device (CPLD), a field-programmable gate array (FPGA), generic array logic (GAL), or any combination thereof.

The memory may include a volatile memory, for example, a random access memory (RAM); or the memory may include a non-volatile memory, for example, a flash memory, a hard disk (HDD), or a solid-state drive (SSD); or the memory may include a combination of the foregoing types of memories.

The communications apparatus in this application may be a network device, or may be a chip or an integrated circuit installed on the network device.

Figure 8:
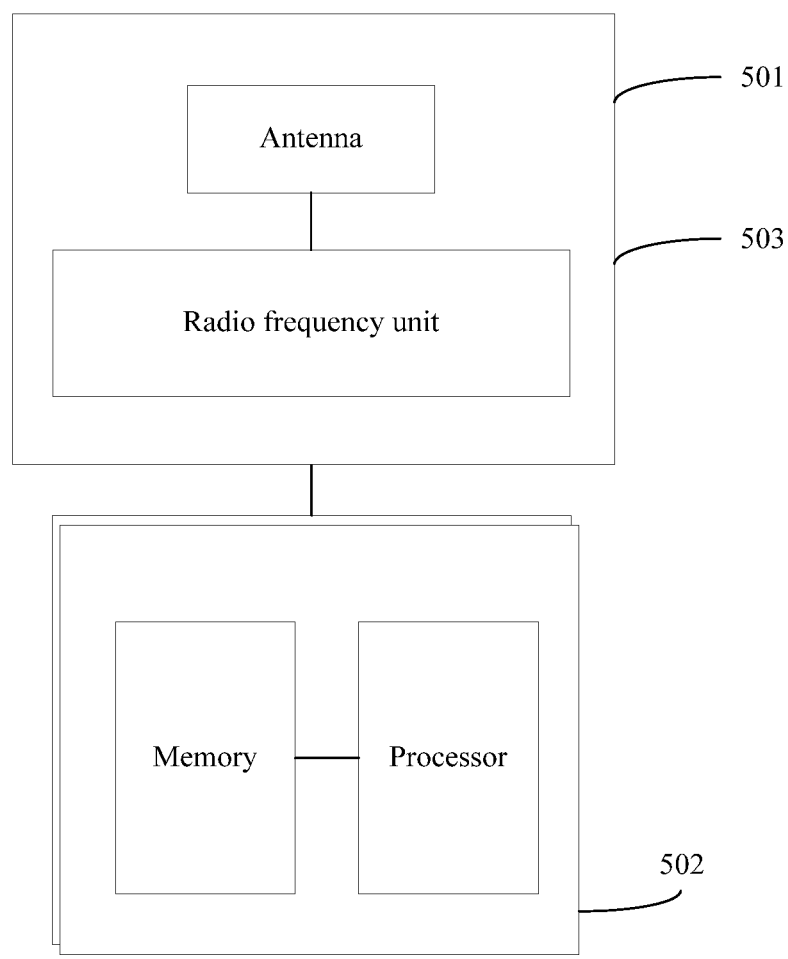
FIG. 8 is a schematic structural diagram of a simplified network device according to an embodiment of this application.

For example, the communications apparatus is a network device. FIG. 8 is a schematic structural diagram of a simplified network device. The network device includes a radio frequency signal receiving/transmitting and conversion part and a part 502. The radio frequency signal receiving/transmitting and conversion part further includes a receiving unit part 501 and a sending unit part 503 (which may also be collectively referred to as a transceiver unit). The radio frequency signal receiving/transmitting and conversion part is mainly used for receiving/receiving of a radio frequency signal and conversion between a radio frequency signal and a baseband signal. The part 502 is mainly used for baseband processing, network device control, and the like. The receiving unit 501 may also be referred to as a receiver, a receiving circuit, or the like, and the sending unit 503 may also be referred to as a transmitter, a transmitting circuit, or the like. The part 502 is usually a control center of the network device, and may be usually referred to as a processing unit, and is configured to control the network device to perform the steps performed by the network device in FIG. 2 or FIG. 3. For details, refer to descriptions of the foregoing related parts.

The part 502 may include one or more boards, and each board may include one or more processors and one or more memories. The processor is configured to read and execute a program in the memory to implement a baseband processing function and control the network device. If there are a plurality of boards, the boards may be interconnected to increase a processing capability. In an optional implementation, a plurality of boards may share one or more processors, or a plurality of boards share one or more memories, or a plurality of boards share one or more processors at the same time.

For example, in an embodiment, the sending unit 503 is configured to perform step S201 in the embodiment shown in FIG. 2, and the receiving unit 501 is configured to perform step S203 in the embodiment shown in FIG. 2.

For another example, in another embodiment, the sending unit 503 is configured to perform step S301 and S302 in the embodiment shown in FIG. 3, and the receiving unit 501 is configured to perform step S304 in the embodiment shown in FIG. 3.

An embodiment of this application further provides a communications apparatus, and the communications apparatus is configured to perform the foregoing communication methods. Some or all of the foregoing communication methods may be implemented by using hardware, or may be implemented by using software. When some or all of the foregoing communication methods are implemented by using hardware, the communications apparatus includes: a transmitter, configured to output information, for example, configured to send, to a terminal device, information indicating a random access preamble format; and a receiver, configured to input information, for example, configured to receive a random access preamble sent by the terminal device at determined transmission power.

Optionally, the communications apparatus may be a chip or an integrated circuit in specific implementation.

Optionally, when some or all of the communication methods in the foregoing embodiments are implemented by using software, the communications apparatus includes: a memory, configured to store a program; and a processor, configured to execute the program stored in the memory. When the program is executed, the communications apparatus may implement the communication methods provided in the foregoing embodiments.

Optionally, the memory may be a physically independent unit, or may be integrated into the processor.

Optionally, when some or all of the communication methods in the foregoing embodiments are implemented by using software, the communications apparatus may alternatively include only a processor. A memory configured to store a program is located outside the communications apparatus, and the processor is connected to the memory by using a circuit/wire, and is configured to read and execute the program stored in the memory.

The processor may be a CPU, an NP, or a combination of a CPU and an NP.

The processor may further include a hardware chip. The hardware chip may be an ASIC, a PLD, or a combination thereof. The PLD may be a CPLD, an FPGA, GAL, or any combination thereof.

The memory may include a volatile memory, such as a RAM; or the memory may include a nonvolatile memory, such as a flash memory, a hard disk, or a solid-state drive; or the memory may include a combination of the foregoing types of memories.

A person of ordinary skill in the art may be aware that, the units and algorithm steps in the examples described with reference to the embodiments disclosed in this specification may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of this application.

It may be clearly understood by a person skilled in the art that, for the purpose of convenient and brief description, for a detailed working process of the system, apparatus, and unit, refer to a corresponding process in the method embodiments. Details are not described herein again.

In the several embodiments provided in this application, it should be understood that the disclosed system, apparatus, and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of the embodiments.

In addition, functional units in the embodiments of this application may be integrated into one processing unit, or each of the units may exist alone physically, or two or more units may be integrated into one unit.

All or some of the foregoing embodiments may be implemented by using software, hardware, firmware, or any combination thereof. When software is used to implement the embodiments, all or some of the embodiments may be implemented in a form of a computer program product. The computer program product includes one or more computer instructions. When the computer program instructions are loaded and executed on a computer, all or some of the processes or functions according to the embodiments of this application are generated. The computer may be a general-purpose computer, a dedicated computer, a computer network, or another programmable apparatus. The computer instructions may be stored in a computer-readable storage medium, or may be transmitted by using the computer-readable storage medium. The computer instruction may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a digital versatile disc (DVD)), a semiconductor medium (for example, a solid state drive (SSD)), or the like.

A person of ordinary skill in the art may understand that all or some of the processes of the methods in the embodiments may be implemented by a computer program instructing related hardware. The program may be stored in a computer readable storage medium. When the program executed, the processes of the foregoing method embodiments are performed. The foregoing storage medium includes: any medium that can store program code, such as a read-only memory (ROM), a random access memory (RAM), a magnetic disk, or an optical disc.

What is claimed is:

1. A communications apparatus, comprising:
   one or more memories configured to store instructions; and one or more processors coupled to the one or more memories and configured to execute the instructions, cause the apparatus to:

determine transmission power for a random access preamble; and send the random access preamble at the transmission power which is a smaller value of the following two values: maximum transmission power allowed by or configured for a terminal device, and a sum of random access preamble target received power, a beam-related offset G of a network device, and a path loss that is estimated by the terminal device, wherein the random access preamble target received power is a sum of the following three parameters: random access preamble initial received target power, an offset based on a random access preamble format, and a product of a quantity of power ramping counter minus 1 and a power ramping step;

wherein the random access preamble format is one of A1, A2, A3, B1, B2, B3, B4, C0, or C2, and the offset based on the random access preamble format is respectively X−3 dB, X−6 dB, X−8 dB, X−3 dB, X−6 dB, X−8 dB, X−11 dB, X+0 dB, or X−6 dB, wherein X=X1+X2, X1 is related to a frequency band on which the random access preamble is located, X2 is configured by the network device, a value of X is 0, 3, 8, 11, 14, 17, 18, 19, or 20, and X2 is 0 or 3; and wherein the beam-related offset G satisfies G=round($-10\times\log_{10} N_b$) and $N_b$ is a quantity of beams of the network device for receiving the random access preamble, wherein $N_b$ is 1, 2, 3, or 4, and round represents round off, round down or round up to the nearest integer.

2. The apparatus according to claim 1, wherein the value of X is 8 for a carrier frequency less than 6 GHz.

3. The apparatus according to claim 1, wherein the value of X is 14 for a carrier frequency greater than 6 GHz.

4. A communications method, comprising:

determining transmission power for a random access preamble; and sending the random access preamble at the transmission power which is a smaller value of the following two values: maximum transmission power allowed by or configured for a terminal device, and a sum of random access preamble target received power, a beam-related offset G of a network device, and a path loss that is estimated by the terminal device, wherein the random access preamble target received power is a sum of the following three parameters: random access preamble initial received target power, an offset based on a random access preamble format, and a product of a quantity of power ramping counter minus 1 and a power ramping step;

wherein the random access preamble format is one of A1, A2, A3, B1, B2, B3, B4, C0, or C2, and the offset based on the random access preamble format is respectively X−3 dB, X−6 dB, X−8 dB, X−3 dB, X−6 dB, X−8 dB, X−11 dB, X+0 dB, or X−6 dB, wherein X=X1+X2, X1 is related to a frequency band on which the random access preamble is located, X2 is configured by the network device, a value of X is 0, 3, 8, 11, 14, 17, 18, 19, or 20, and X2 is 0 or 3; and wherein the beam-related offset G satisfies G=round($-10\times\log_{10} N_b$) and $N_b$ is a quantity of beams of the network device for receiving the random access preamble, wherein $N_b$ is 1, 2, 3, or 4, and round represents round off, round down or round up to the nearest integer.

5. The method according to claim 4, wherein the value of X is 8 for a carrier frequency less than 6 GHz.

6. The method according to claim 4, wherein the value of X is 14 for a carrier frequency greater than 6 GHz.

7. A non-transitory computer readable medium, wherein the non-transitory computer readable medium stores instructions that are executable by a computer, and the instructions comprise instructions for:

determining transmission power for a random access preamble; and sending the random access preamble at the transmission power which is a smaller value of the following two values: maximum transmission power allowed by or configured for a terminal device, and a sum of random access preamble target received power, a beam-related offset G of a network device, and a path loss that is estimated by the terminal device, wherein the random access preamble target received power is a sum of the following three parameters: random access preamble initial received target power, an offset based on a random access preamble format, and a product of a quantity of power ramping counter minus 1 and a power ramping step;

wherein the random access preamble format is one of A1, A2, A3, B1, B2, B3, B4, C0, or C2, and the offset based on the random access preamble format is respectively X−3 dB, X−6 dB, X−8 dB, X−3 dB, X−6 dB, X−8 dB, X−11 dB, X+0 dB, or X−6 dB, wherein X=X1+X2, X1 is related to a frequency band on which the random access preamble is located, X2 is configured by the network device, a value of X is 0, 3, 8, 11, 14, 17, 18, 19, or 20, and X2 is 0 or 3; and wherein the beam-related offset G satisfies G=round($-10\times\log_{10} N_b$) and $N_b$ is a quantity of beams of the network device for receiving the random access preamble, wherein $N_b$ is 1, 2, 3, or 4, and round represents round off, round down or round up to the nearest integer.

8. The non-transitory computer readable medium according to claim 7, wherein the value of X is 8 for a carrier frequency less than 6 GHz.

9. The non-transitory computer readable medium according to claim 7, wherein the value of X is 14 for a carrier frequency greater than 6 GHz.

* * * * *